(12) United States Patent
Niwa et al.

(10) Patent No.: US 6,589,448 B2
(45) Date of Patent: Jul. 8, 2003

(54) CERAMIC BALL FOR BEARING AND CERAMIC BALL BEARING USING THE SAME

(75) Inventors: Tomonori Niwa, Ichinomiya (JP); Tetsuji Yogo, Nagoya (JP)

(73) Assignee: NGK Spark Plug Co., Ltd., Nagoya (JP)

(*) Notice: Subject to any disclaimer, the term of this patent is extended or adjusted under 35 U.S.C. 154(b) by 0 days.

(21) Appl. No.: 09/832,047

(22) Filed: Apr. 10, 2001

(65) Prior Publication Data

US 2002/0003228 A1 Jan. 10, 2002

(30) Foreign Application Priority Data

Apr. 12, 2000 (JP) .......................... 2000-111312

(51) Int. Cl.⁷ .................. C04B 35/58; C04B 35/64; F16C 16/02; F16C 33/34
(52) U.S. Cl. .............. 252/516; 252/504; 252/507; 252/509; 252/515; 252/516; 252/519.12; 501/88; 501/92; 501/96.1; 501/97.1; 501/103; 501/104; 501/134; 501/136; 423/289; 423/297; 423/345; 423/353; 423/608; 423/610; 384/49; 384/492; 384/913; 29/898.06; 264/125; 264/332
(58) Field of Search ............ 501/94, 96.1, 97.1, 501/103, 134; 252/516, 519.12, 520.02; 423/345, 289, 297, 344, 353, 608; 384/49, 492, 913; 29/898.06; 264/125, 332

(56) References Cited

U.S. PATENT DOCUMENTS 4,615,990 A * 10/1986 Richon et al. ............. 264/125
4,690,910 A * 9/1987 Tsukuma et al. ........... 501/103
5,094,986 A * 3/1992 Matsumoto et al. ....... 501/96.3

FOREIGN PATENT DOCUMENTS

| DE | 3840171 | * 11/1988 | ......... C04B/35/584 |
| JP | 1-15523 | 1/1989 | ............ F16C/33/32 |
| JP | 06-305837 | * 11/1994 | ............ C04B/35/58 |
| JP | 2000-192969 | 7/2000 | ............ F16C/33/32 |

OTHER PUBLICATIONS

The Journal of American Chemical Society, vol. 57, pp. 1754–1755 (1935).

* cited by examiner

Primary Examiner—Mark Kopec
Assistant Examiner—Kallambella Vijayakumar
(74) Attorney, Agent, or Firm—Brinks Hofer Gilson & Lione

(57) ABSTRACT

A ceramic bearing ball in which at least a portion of a constituent ceramic is formed of an electrically conductive inorganic compound phase, whereby a proper electrical conductivity is imparted to the ceramic. Thus, electrifying of a bearing ball is prevented or effectively suppressed. This prevents the problem involved in production of balls of small diameter wherein such balls adhere to an apparatus (e.g., a container) during production thereof, thus hindering smooth progress of the production process. In addition, when ceramic balls are used in precision electronic equipment, such as a hard disk drive of a computer, which is operated at high rotational speed, adhesion of foreign substance due to electrification of the balls, and resultant generation of abnormal noise or vibration can be prevented or effectively suppressed.

8 Claims, 12 Drawing Sheets

FORMING NUCLEI 50
FORMING MATERIAL POWDER 10

FORMING MATERIAL POWDER LAYER 10k

HOT AIR

HOT AIR

CUMULATIVE RELATIVE FREQUENCY $n_{rc} = \dfrac{N_c}{N_o} \times 100$ (%)

$N_o$: TOTAL FREQUENCY $N_c$: CUMULATIVE FREQUENCY

90% GRAIN SIZE: GRAIN SIZE CORRESPONDING TO $n_{rc}=90\%$

50% GRAIN SIZE: GRAIN SIZE CORRESPONDING TO $n_{rc}=50\%$ $$d = \frac{dmax + dmin}{2}$$

CERAMIC BALL FOR BEARING AND CERAMIC BALL BEARING USING THE SAME

BACKGROUND OF THE INVENTION

1. Field of the Invention

The present invention relates to a ceramic ball and a ceramic ball bearing using the same.

2. Description of Related Art

In general, balls used in ball bearing assemblies (hereinafter referred to as bearing balls) are formed of a metal such as bearing steel. However, in order to improve wear resistance, ball bearing assemblies utilizing ceramic ball bearings have come into wide use. Examples of ceramic used for such ceramic bearing balls include silicon nitride ceramic, alumina ceramic, and zirconia ceramic.

The above-described ceramic balls for ball bearing assemblies are all insulating materials. Therefore, when the ceramic balls in a ball bearing assembly rotate, the ceramic balls are electrified with static electricity generated due to friction. When such electrification occurs excessively during production of balls of small diameter, the balls adhere to an apparatus (e.g., a container), or dust adheres to the balls, thus hindering smooth progress of the production process.

Further, in the case of ceramic balls of a bearing assembly used in a hard disk drive of a computer, if a foreign substance such as dust adheres to the balls, inner ring or outer ring of the bearing due to static electricity, the foreign substance often causes generation of abnormal noise or vibration, because the bearing is used at high speed.

Further objects and advantages of the present invention will become apparent by reference to the following description of the preferred embodiment and appended drawings, wherein like reference numbers refer to the same component, element or feature.

SUMMARY OF THE INVENTION

The present invention provides a ceramic ball for a bearing, characterized in that at least a portion of the ball's constituent ceramic is formed of an electrically conductive inorganic compound phase. Conceptually, the term "electrically conductive inorganic compound phase" encompasses a "semi-conductive inorganic compound phase."

The present invention further provides a ball bearing which includes a plurality of the above-described ceramic balls as bearing rolling elements. Such a ball bearing is preferably used as a bearing component of a rotary spindle unit of a hard disk, which is a magnetic storage medium. Specifically, there can be constructed a hard disk drive mechanism which comprises the above-described ball bearing, one of the outer and inner rings of the ball bearing being fixed, and the other of the outer and inner rings serving as a rotary member; a drive unit for rotating the rotary member; and a hard disk which rotates together with the rotary member.

When at least a portion of the constituent ceramic is formed of an electrically conductive inorganic compound phase to thereby impart a proper degree of electrical conductivity to the ceramic, electrification of bearing balls can be prevented or suppressed effectively. This solves the problem involved in production of balls of small diameter such that the balls adhere to an apparatus (e.g., a container), thereby hindering smooth progress of the production process. Further, when the ball is used in precision electronic equipment, such as a hard disk drive for a computer, which is operated at high rotational speed, adhesion of foreign substance to the ball due to electrification and resultant generation of abnormal noise and vibration can be prevented or suppressed effectively. For example, even when the bearing of the present invention is used at high rotational speed (e.g., 5400 to 15,000 rpm) in such precision electronic equipment, long service life can be secured.

Due to the improved electrical conductivity of the ball bearing, in addition to prevention of electrification by static electricity, the following effect is obtained in some cases, depending on the field to which the ball bearing is applied. In a measurement apparatus for semiconductor wafers, such as a measurement apparatus for measuring the flatness of a semiconductor wafer, while a rotary measurement table carrying a wafer is rotated, electricity is applied between the wafer and the rotary measurement table in order to measure an electrostatic capacitance, on the basis of which the flatness of the wafer is evaluated. In such a case, electricity is supplied to the rotary measurement table, typically via a bearing and a rotary spindle of the table, which form a conduction path. Therefore, in order to establish a conduction path between the inner and outer rings of a bearing, bearing balls used in the above-described field have conventionally been formed of a metal such as bearing steel. However, bearing balls formed of a metal is inferior in wear resistance to ceramic bearing balls, so that the metal bearing balls have drawbacks, such as generation of dust and short service life. On the other hand, when bearing balls are formed of an ordinary insulating ceramic, a conduction path cannot be secured.

Thus it is an object of the present invention is to provide a ceramic ball for a bearing which is hardly electrified and thus can prevent occurrence of a problem, such as generation of abnormal noise or vibration, which would otherwise be caused by adhesion of foreign substance, even when the ball is used in a high speed bearing.

A further object of the present invention is to provide a ceramic ball bearing using the ceramic ball.

Further objects and advantages of the present invention will become apparent by reference to the following description of the preferred embodiment and appended claims wherein like reference numbers refer to the same component, element or feature.

DESCRIPTION OF THE PREFERRED EMBODIMENT

Figure 1:
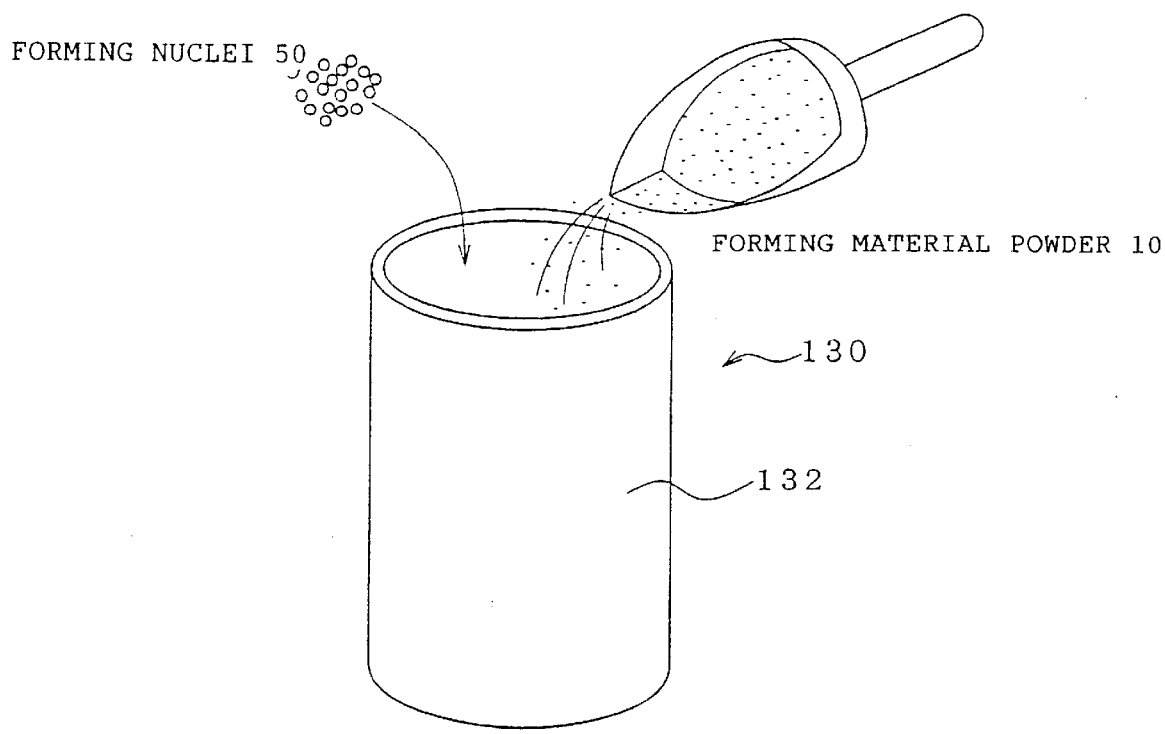
FIG. 1 is a diagrammatic view showing a step of rolling granulation wherein forming nuclei and forming material powder are mixed.

In the ceramic ball of the present invention, at least a portion of the constituent ceramic is formed of an electrically conductive inorganic compound phase in order to impart electrical conductivity to the ball. Thus, a conduction path can be secured in a measurement apparatus as described above, even when ceramic which is superior in wear resistant to metal is used.

In order to prevent electrification of ceramic balls for a bearing, the constituent ceramic of the balls preferably has an electrical resistivity of not greater than $10^6$ Ω·cm. When the electrical resistivity exceeds $10^6$ Ω·cm, the balls are likely to be electrified when the balls are built in a bearing and used, which may result in occurrence of the above-described problem. When the above-described electrical measurement is performed via bearing balls, the electrical resistivity of the constituent ceramic of the balls is preferably set to a slightly lower value; e.g., to $10^5$ Ω·cm or less. The term "electrical resistivity" used in the present specification refers to an electrical resistivity which is measured by a four probe method making use of probes which are brought into contact with the surface of a ball formed of a constituent ceramic.

The electrically conductive inorganic compound phase contained in the constituent ceramic may be formed of an electrically conductive inorganic compound which contains as a cationic component at least one element selected from among Hf, Mo, Ti, Zr, Nb, W, and Si. Since these electrically conductive inorganic compounds have good electrical conductivity, relatively high hardness and excellent durability, they can be preferably used as the constituent ceramic of the ceramic ball for a bearing of the present invention. The electrically conductive inorganic compound may consist of at least one member selected from among metal nitrides, metal carbides, metal borides, metal carbide nitrides, each containing as a metallic cationic component at least one element selected from among Hf, Mo, Ti, Zr, Nb, and Ta, tungsten carbide and silicon carbide. Specifically, examples of the electrically conductive inorganic compound include titanium nitride, titanium carbide, titanium boride, tungsten carbide, zirconium nitride, titanium carbide nitride, silicon carbide, and niobium carbide.

Moreover, the electrically conductive inorganic compound may be an electrically conductive oxide. Specific examples of the electrically conductive oxide include a titanium oxide (e.g., $TiO_2$), tin oxide ($SnO_2$), copper oxide ($Cu_2O$), chromium oxide ($Cr_2O_3$) and nickel oxide (NiO).

The above-described constituent ceramic may be a composite ceramic which has a microstructure such that the electrically conductive inorganic compound phase is dispersed in a ceramic matrix formed of alumina ceramic, zirconia ceramic, or silicon nitride ceramic. Since alumina ceramic, zirconia ceramic, and silicon nitride ceramic all have excellent wear resistance, selective use of these ceramics as a ceramic matrix further improves the wear resistance of the bearing balls, so that both high electrical conductivity and high mechanical durability can be realized.

When the above-described composite ceramic is used as the constituent ceramic, the content of the electrically conductive inorganic compound phase in the constituent ceramic is preferably 15 to 70% by volume. When the content of the electrically conductive inorganic compound phase becomes less than 15% by volume, the conductivity of the composite ceramic becomes insufficient (e.g., the above-described electrical resistivity of $10^6$ Ω·cm or less cannot be secured), so that the above-described effects of the present invention may fail to be achieved to a sufficient extent. When the content of the electrically conductive inorganic compound phase exceeds 70% by volume, the properties of ceramic which constitutes the ceramic matrix are not exhibited sufficiently, with the result that appreciable improvement of wear resistance, etc., through employment of a composite material cannot be expected. More preferably, the content of the electrically conductive inorganic compound phase is set to 30 to 50% by volume. The above-described composite ceramic material is obtained through a process of mixing a powder which serves as a source material for forming the electrically conductive inorganic compound phase into a forming material powder which serves as a raw material of the ceramic matrix (e.g., alumina ceramic, silicon nitride ceramic, or zirconia ceramic); forming the mixture into a green body; and firing the green body.

Since silicon nitride ceramic has high strength and excellent wear resistance, use of silicon nitride ceramic as a material for the ceramic matrix is particularly preferred in the present invention. The silicon nitride ceramic contains a predominant amount of silicon nitride, the balance being a sintering aid component. Such a sintering aid component may be at least one element selected from the group consisting of Mg and elements belonging to Groups 3A, 4A, 5A, 3B (e.g., Al (aluminum)), and 4B (e.g., Si (silica)) of the Periodic Table, and may be contained in an amount of 1% by weight to 10% by weight on the basis of oxide. These elements are present within a sintered body in the form of respective oxides (in this case the sintering aid component content refers to content of the sintering aid component in the silicon nitride ceramic serving as a matrix). When the content of the sintering aid component is less than 1% by weight, obtaining a dense sintered body becomes difficult. When the content of the sintering aid component is in excess of 10% by weight, a produced sintered body suffers lack of strength, toughness, or heat resistance and a produced sintered body serving as a sliding component suffers an impairment in wear resistance. Preferably, the sintering aid component is contained in an amount of 2% by weight to 8% by weight. It is to be noted that in the present invention, unless otherwise specified, the terms "predominantly" and "mainly" used in relation to content mean that a substance in question is contained in an amount of not less than 50% by weight.

Examples of a commonly used sintering aid component belonging to Group 3A include Sc, Y, La, Ce, Pr, Nd, Sm, Eu, Gd, Tb, Dy, Ho, Er, Tm, Yb, and Lu. The content of each of these elements R is expressed on the basis of $RO_2$ for Ce and on the basis of $R_3O_3$ for the remaining elements. Particularly, oxides of heavy-rare earth elements Y, Ce, Tb, Dy, Ho, Er, Tm, and Yb are used favorably, since they have the effect of improving strength, toughness, and wear resistance of a sintered silicon nitride body. Moreover, other than the above-described elements, any of magnesia spinel, zirconia, etc. may be used as a sintering aid.

The microstructure of the sintered silicon nitride member is such that crystal grains comprising a predominant amount of silicon nitride and forming a main phase are bonded by means of a glassy and/or crystalline binding phase. Preferably, the main phase comprises a predominant $Si_3N_4$ phase whose $P\text{-}Si_3N_4$ content is not less than 70% by volume (preferably not less than 90% by volume). In this case, the $Si_3N_4$ phase may be such that a portion of Si or N may be substituted by Al or oxygen and may contain metallic atoms, such as Li, Ca, Mg, and Y, to form solid solution. Examples of substituted silicon nitride include sialons represented by the following formulas.

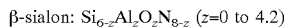
β-sialon: $Si_{6-z}Al_zO_zN_{8-z}$ (z=0 to 4.2)

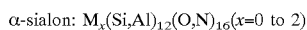
α-sialon: $M_x(Si,Al)_{12}(O,N)_{16}$ (x=0 to 2)

M: Li, Mg, Ca, Y, R (R represents a rare earth metal element other than La or Ce)

The aforementioned sintering aid component mainly constitutes the binding phase, but a portion of the sintering aid component may be incorporated into the main phase. In addition to intentionally added components serving as sintering aids, the binding phase may contain unavoidable impurities; for example, silicon oxide contained in a material silicon nitride powder.

Silicon nitride powder whose (α-$Si_3N_4$ content (a ratio of ox silicon nitride with respect to the entire silicon nitride) is not less than 70% is preferably used as a raw material. In the raw material, at least one element selected from the group consisting of rear earth elements and elements belonging to Groups 3A, 4A, 5A, 3B, and 4B of the Periodic Table may be added, as a sintering aid, in an amount of 1% by weight to 10% by weight, preferably, in an amount of 2% by weight to 8% by weight, on the basis of oxide. When the raw materials are mixed, these elements may be mixed not necessarily in the form of oxides, but in the form of a compound which can be converted to an oxide through sintering, such as a carbonate or hydroxide.

When the zirconia (zirconium oxide) ceramic has a composition for partially stabilized zirconia, stresses stemming from phase transformation can be mitigated to thereby increase the toughness of the ceramic. $ZrO_2$ and $HfO_2$, which are predominant components of the zirconia ceramic phase, are known to undergo phase transformation, induced by change in temperature, among three different crystal structure phases. Specifically, these compounds assume the monoclinic system phase at low temperature, including room temperature; the tetragonal system phase at higher temperature; and the cubic system phase at further higher temperature. When the entire zirconia ceramic phase consists of at least one of $ZrO_2$ and $HfO_2$, substantially the entirety of the phase is considered to assume the monoclinic system phase at about room temperature. However, when an alkaline earth metal oxide or a rare earth metal oxide (e.g., calcia (CaO) or yttria ($Y_2O_3$)) serving as a stabilizing component is added in a specific amount or more to $ZrO_2$ and $HfO_2$ so as to form solid solution, the temperature of transformation between the monoclinic system phase and the tetragonal system phase is lowered, to thereby stabilize the tetragonal system phase at about room temperature.

The aforementioned phase transformation from the tetragonal system phase to the monoclinic system phase is known to be induced by the Martensitic transformation mechanism or a similar phase transformation mechanism. When external stress acts on the aforementioned tetragonal system phase, the transformation temperature increases, with the result that the tetragonal system phase undergoes stress-induced transformation. In addition, strain energy generated by the stress is consumed to induce the transformation, so that the applied stress is relaxed. Accordingly, when stresses concentrate at the end of a crack generated in the material, the tetragonal system phase transforms to the monoclinic system phase and the stress is relaxed, so that propagation of cracking is prevented or suppressed, thus improving fracture toughness.

Regarding components for stabilizing the zirconia ceramic phase, one or more species of Ca, Y, Ce, and Mg are preferably incorporated into the zirconia ceramic phase in a total amount of 1.4 to 4 mol % as reduced to oxides; i.e., CaO, $Y_2O_3$, $CeO_2$, and MgO, respectively. When the total amount of the components is less than 1.4 mol %, the monoclinic system phase content increases, to thereby lower the relative tetragonal system phase content. In this case, the effect for relaxing the stress cannot be fully attained and wear resistance may become insufficient. When the total amount of the components is in excess of 4 mol %, the cubic system phase content increases, and, similar to the above case, the durability might be insufficient. Thus, the total amount of the components is preferably 1.5 to 4 mol %, more preferably 2 to 4 mol %.

Specifically, in the present invention, $Y_2O_3$ is preferably used as the component for stabilizing the tetragonal system phase, since $Y_2O_3$ is comparatively inexpensive, and a ceramic material produced by use thereof can be endowed with high mechanical strength as compared with the case in which a ceramic material is produced by use of other stabilizing components. When CaO or MgO is used, a ceramic material produced by use thereof can be endowed with comparatively high mechanical strength, which, however, is lower than that attained by use of $Y_2O_3$. In addition, CaO and MgO are more inexpensive than $Y_2O_3$. Thus, CaO and MgO are also preferably used in the present invention. $Y_2O_3$, CaO, and MgO may be used singly or in combination of two or more species.

Notably, $ZrO_2$ and $HfO_2$—predominant components of the zirconia ceramic phase (in the present specification, "predominant component" refers to a component whose content by weight is the highest among all components)—are similar to each other in terms of chemical and physical properties. Thus, these two components may be used singly or in combination. However, more preferably, the zirconia ceramic phase is formed predominantly of $ZrO_2$, which is inexpensive as compared with $HfO_2$. In many cases, generally available $ZrO_2$ raw material of standard purity contains a trace amount of $HfO_2$. However, for the aforementioned reason, intentional removal of $HfO_2$ before use of such a raw material is unnecessary.

In the zirconia ceramic phase, the ratio of the weight of the cubic system phase (CW) to that of the tetragonal system phase (TW); i.e., CW/TW is preferably less than 1. The cubic system phase is prone to be generated when the temperature of transformation between the cubic system phase and the tetragonal system phase is lowered due to an increase in amount of the aforementioned stabilizing component or when the firing temperature is in excess of 1600° C. As compared with the monoclinic system phase and the tetragonal system phase, the cubic system phase tends to generate coarsening crystal grains during firing. The thus-coarsened crystal grains in the cubic system phase easily drop off, because interfacial bonding strength to other crystal grains is low. Furthermore, if the amount of the cubic system phase increases to such a level that the aforementioned ratio exceeds 1, the amount of such coarsened crystal grains increases accordingly. In either case, chipping resistance is impaired. Accordingly, the ratio CW/TW is controlled to less than 1, preferably less than 0.5, more preferably less than 0.1.

The information in relation to the ratio of the tetragonal system phase to the cubic system phase is obtained in the following manner. For example, a portion of a ceramic material is mirror polished, and the thus-polished surface is investigated through X-ray diffractometry. In this case, the main diffraction peaks; i.e., that attributed to (1 1 1), of the tetragonal system phase and that of the cubic system phase, are observed in the obtained diffraction pattern such that the two peaks are close to each other. Therefore, initially, the amount of the monoclinic system phase is obtained from the ratio of the total intensity of (1 1 1) intensity and (1 1 -1) intensity (Im) to the sum of (1 1 1) intensity of the tetragonal system phase and that of the cubic system phase (It+Ic). Subsequently, the sintered ceramic material is mechanically crushed, and the crushed matter is again subjected to X-ray diffractometry, to thereby obtain (1 1 1) intensity I'm of the monoclinic system phase and (1 1 1) intensity I'c of the cubic system phase. Due to mechanical stress generated during the above crushing process, the tetragonal system phase of the sintered ceramic material is considered to be transformed to the monoclinic system phase. Thus, the amount of the cubic system phase can be obtained from the ratio, I'c/(I'm+I'c). The thus-obtained ratio I'c/(I'm+I'c) is 0.5 or less, preferably 0.1 or less, in view of enhancement of durability of ceramic balls.

When alumina ceramic is used, a mixture of alumina powder and powder of an appropriate sintering aid (e.g., an oxide of Mg, Ca, Si, Na, etc.) is used as a forming material powder for forming the ceramic matrix. The thus-obtained alumina ceramic matrix preferably contains the above-described sintering aid component in an amount of 0.1 to 10% by weight on the basis of oxide, with the balance being an Al component in the form of $Al_2O_3$.

Alumina is inexpensive and is better in terms of chemical stability as compared to the above-described silicon nitride ceramic or zirconia ceramic. Therefore, alumina can be used in applications in which a ball bearing is to be used in a corrosive environment, such as in a semiconductor fabrication apparatus and applications in which a ball bearing is not to be used at high speed rotation, such as in measurement of flatness of a semiconductor wafer.

Next will be described a desirable method for producing ceramic balls for a bearing according to the present invention. When bearing ceramic balls having a small diameter of 8 mm or less, in particular 5 mm or less, and an improved dimensional accuracy are to be produced, the density of a green body must be increased to the greatest possible extent, such that its relative density becomes 61% or higher. In order to obtain such a green body of high density, a die pressing method can be used solely or in combination with a cold isostatic pressing (CIP) method. The present inventors have conducted keen studies and found that use of a rolling granulation method is effective for increasing the density of a green body of small diameter. This method comprises a rolling granulation step in which a forming material powder containing a material powder of ceramic (e.g., in the case in which a composite ceramic containing an electrically conductive inorganic compound phase dispersed in a ceramic matrix is to be obtained, material powders for forming the electrically conductive inorganic compound and the ceramic matrix are mixed so as to obtain the forming material powder) is placed in a granulation container, and within the container, aggregates of the forming material powder are tumbled, so that the aggregates are grown into a spherical shape to thereby obtain spherical green bodies; a step of firing the spherical green bodies; and a step of polishing the surface of fired bodies to thereby obtain ceramic balls for a bearing. The rolling granulation method enables easy production of green bodies having a small diameter of 8 mm or less, in particular 5 mm or less, and high density, unlike conventional press molding which has had difficulty in obtaining green bodies having a high degree of sphericity. Moreover, the efficiency of production of spherical green bodies is high and the problem of an increased polishing allowance can be avoided, because an unnecessary flange portion is not produced on a green body which would be formed in the case of press forming.

In this case, the density of green bodies can be increased effectively through use of a method in which the forming material powder is supplied and caused to adhere to green bodies in the midst of formation thereof, while liquid containing a predominant amount of a liquid forming medium is supplied to the green bodies. A specific example of the liquid forming medium is an aqueous solvent such as water or an aqueous solution containing water and an appropriate additive. However, the liquid forming medium is not limited thereto, and an organic solvent may be used. In this method, when the liquid forming medium and the forming material powder adhere to pits and projection present on the surface of a green body, particles of the powder adhere to the green body while forming a dense array, due to the osmotic pressure of the liquid forming medium. This is a possible mechanism which increases the density of green bodies. In order to enhance this effect, the liquid forming medium is preferably sprayed directly to green bodies. The operation of spraying the liquid forming medium may be performed over the entire period of a forming step (e.g., a rolling granulation step) or over a portion of the forming step (e.g., in a final stage only). Moreover, the liquid forming medium may be supplied continuously or intermittently.

Figure 12:
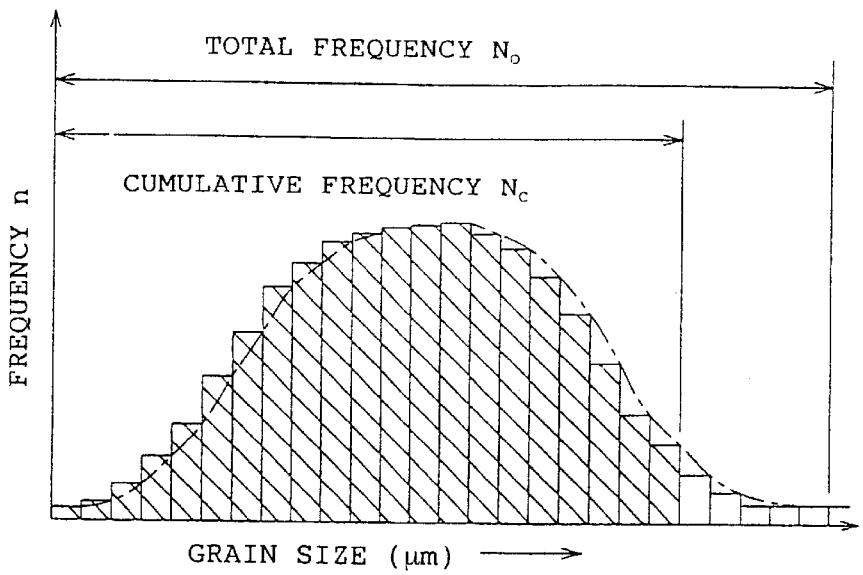
FIG. 12(a) is a graph showing the relationship between grain size and relative frequency.
FIG. 12(b) is a graph showing the relationship between grain size and cumulative relative frequency.
Figure 12:
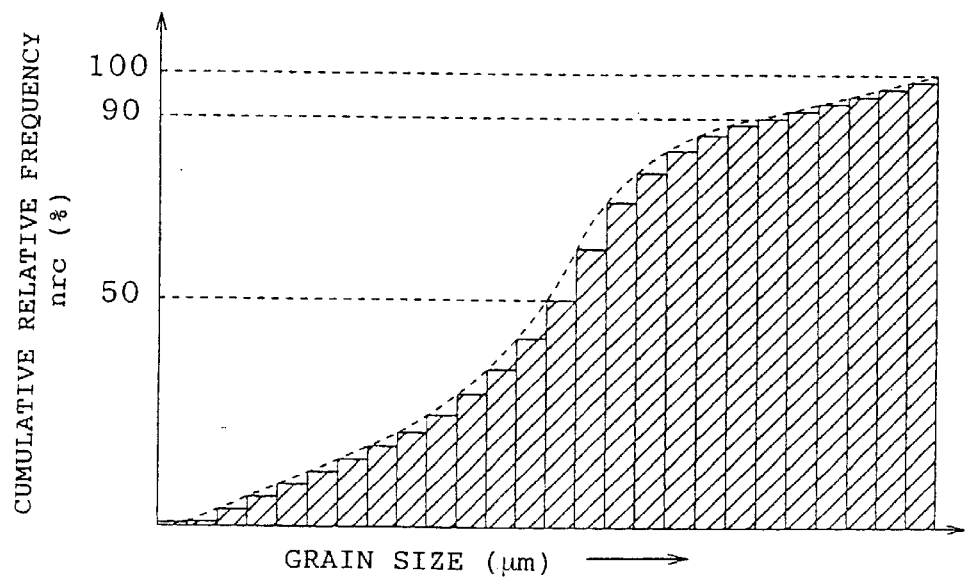

Herein, the cumulative relative frequency with respect to grain size as measured in the ascending order of grain size is defined in the following manner. As shown in FIG. 12, frequencies of grain sizes of particles to be evaluated are distributed in the ascending order of grain size. In the cumulative frequency distribution of FIG. 12, Nc represents the cumulative frequency of grain sizes up to the grain size in question, and N0 represents the total frequency of grain sizes of particles to be evaluated. The relative frequency nrc is defined as "(Nc/N0)×100 (%)." The X % grain size refers to a grain size corresponding to nrc=X (%) in the distribution of FIG. 12. For example, the 90% grain size is a grain size corresponding to nrc=90 (%).

Figure 16:
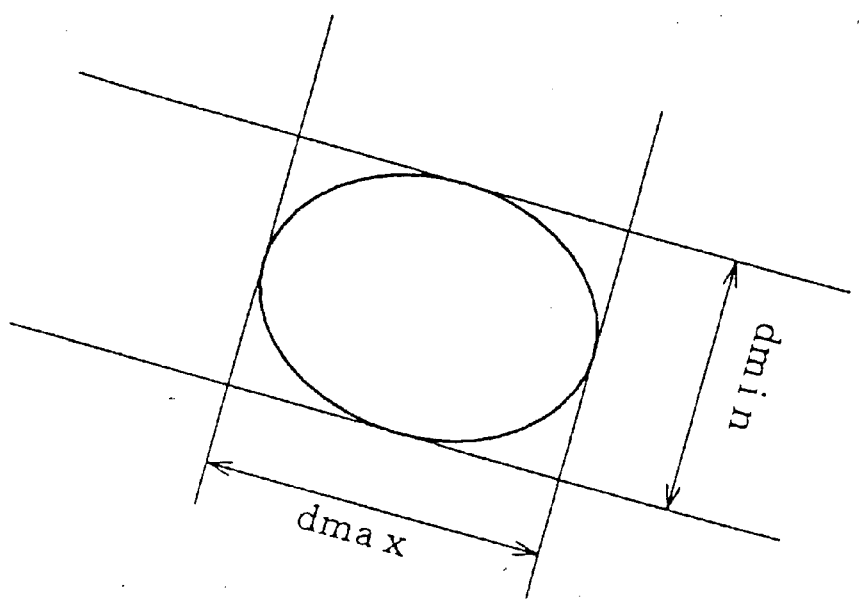
FIG. 16 is a diagrammatic view showing a definition of the dimension of a crystal grain or defect.

The size of a crystal grain or a defect is defined in the following manner. As shown in FIG. 16, various parallel lines circumscribe a crystal grain or a defect which is observed on the microstructure of a polished surface by means of SEM or like equipment. The size of the crystal grain or defect is represented with an average value of the minimum distance dmin between such parallel lines and the maximum distance dmax between such parallel lines (i.e., size d=(dmin+dmax)/2).

A forming material powder which can be effectively used in the rolling granulation process has an average grain size of 0.3 to 2 μm and a 90% grain size of 0.7 to 3.5 μm as measured by use of a laser diffraction granulometer and a BET (an acronym representing originators, Brunauer, Emett, and Teller) specific surface area of 5 to 13 m²/g.

By use of a forming material powder having an average grain size and a 90% grain size, as measured by use of a laser diffraction granulometer, falling within the above-mentioned ranges and a BET specific surface area falling within the above-mentioned respective ranges, a formed green body becomes unlikely to suffer nonuniform density or discontinuous boundaries which would otherwise result from biased distribution of powder particles, thereby drastically reducing fraction defective with respect to deformation, cracking, or chipping in manufacture of a sintered body. The present invention has been achieved on the basis of these findings. The measuring principle of a laser diffraction granulometer is publicly known. Briefly, sample powder is irradiated with a laser beam. A beam diffracted by powder particles is detected by means of a photodetector. The scattering angle and the intensity of the diffracted beam are obtained from the data detected by the photodetector. The grain size of the sample powder can be obtained from the scattering angle and the intensity.

Figure 11:
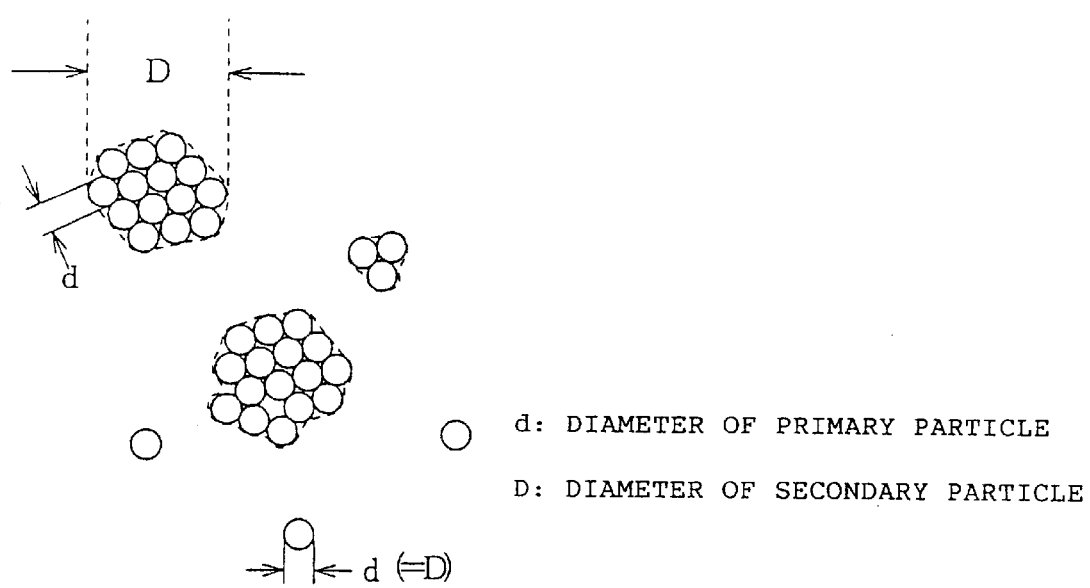
FIG. 11 is a diagrammatic view showing the diameter of a primary particle and the diameter of a secondary particle.

The forming material powder, which is composed of ceramic material, often contains secondary particles, as shown schematically in FIG. 11. Various factors, such as the action of an added organic binder and an electrostatic force, cause a plurality of primary particles to aggregate into a secondary particle. In measurement by use of a laser diffraction granulometer, an aggregate particle and a solitary primary particle do not exhibit much difference in the diffracting behavior of an incident laser beam. Accordingly, whether a measured grain size is of a solitary primary particle or of an aggregate secondary particle is not definitely known. That is, the thus-measured grain size reflects the diameter of a secondary particle D shown in FIG. 11 (in this case, a solitary primary particle is also considered to be a secondary particle as defined in a broad sense). An average grain size or 90% grain size calculated from the measured grain size reflects an average grain size or a 90% grain size with respect to secondary particles.

The specific surface area of the forming material powder is measured by the adsorption method. Specifically, the specific surface area can be obtained from the amount of gas adsorbed on the surface of powder particles. According to general practice, an adsorption curve indicative of the relationship between the pressure of gas to be measured and the amount of adsorption is obtained through measurement. The known BET formula related to polymolecular adsorption is applied to the adsorption curve so as to obtain the amount of adsorption vm upon completion of a monomolecular layer. A BET specific surface area calculated from the obtained amount of adsorption vm is used as the specific surface area of the powder. However, when approximation does not make much difference, the amount of adsorption vm of the monomolecular layer may be read directly from the adsorption curve. For example, when the adsorption curve contains a section in which the pressure of gas is substantially proportional to the amount of adsorption, the amount of adsorption corresponding to the low-pressure end point of the section may be read as the vm value (refer to the monograph by Brunauer and Emett appearing in The Journal of American Chemical Society, Vol. 57 (1935), page 1754). Since molecules of adsorbed gas penetrate into a secondary particle to thereby cover individual constituent primary particles of the secondary particle, the specific surface area obtained by the adsorption method reflects the specific surface area of a primary particle and thus reflects the average value of the diameter of a primary particle d shown in FIG. 11.

In order to obtain a ceramic sintered body that has sufficiently high density and strength with few defects, the above-mentioned forming material is prepared in such a manner as to have a relatively small BET specific area of 5 to 13 m²/g, which reflects the diameter of a primary particle. An important point is that the forming material powder is prepared to have an average grain size or a 90% grain size, which is measured by use of a laser diffraction granulometer and which reflects the diameter of a secondary particle, as small as about ¹⁄₁₀ or less that of a forming material powder obtained by means of the spray-drying process; i.e., an average grain size of 0.3 to 2 μm, or a 90% grain size of 0.7 to 3.5 lm. This indicates that the forming material powder is unlikely to suffer nonuniform aggregation with respect to secondary particles and associated nonuniform distribution density of particles. Thus, through employment of the above-mentioned range of grain size, a formed green body becomes unlikely to suffer biased distribution of powder particles.

When the average grain size of the forming material powder is in excess of 2 μm, or the 90% grain size is in excess of 3.5 μm, a formed green body becomes likely to suffer biased distribution of powder particles, potentially causing a sintered body to suffer nonuniform contraction with resultant deformation, cracking or chipping of the sintered body. Meanwhile, the forming material powder having the above-mentioned average grain size of less than 0.3 Am or a 90% grain size of less than 0.7 μm requires a considerably long preparation time (for example, a considerably long pulverization time), resulting in increased manufacturing cost due to impaired manufacturing capability. Preferably, the average grain size of the forming material powder is 0.3 to 1 μm, and the 90% grain size is 0.7 to 2 μm.

When the BET specific surface area of the forming material powder is less than 5 m²/g, the diameter of a primary particle becomes excessively large, causing nonuniform sintering. As a result, an obtained spherical sintered body suffers defects with a resultant impairment in strength. Meanwhile, the forming material powder having a BET specific surface area in excess of 13 m²/g requires a considerably long preparation time (for example, a considerably long pulverization time), resulting in increased manufacturing cost due to impaired manufacturing capability. Preferably, the BET specific surface area of the forming material powder is 5 to 10 m²/g.

The process for preparing the above-mentioned forming material powder may include, for example, a slurry preparation step, a drying step, and a collection step. In the slurry preparation step, ceramic powder, sintering aid powder, and solvent are mixed to thereby prepare slurry. In the drying step, an aggregation of granular or agglomerate drying media of ceramic or metal is disposed at an intermediate position of a hot air passage such that the drying media can flow H or vibrate within a predetermined spatial range; hot air is passed through the dry media aggregate so as to cause the drying media to flow or vibrate within the spatial range; and the slurry is fed to the flowing or vibrating drying media so that the slurry is mixed with the drying media to thereby evaporate the solvent and thus yield the forming material powder. In the collection step, the thus-obtained forming material powder is conveyed, by means of the hot air, toward a position located downstream of the dry media aggregate, whereby the forming material powder is collected.

According to the above-mentioned method, the slurry is fed to the dry media aggregate, and the fed slurry is dried by means of hot air to become powder. The thus-formed powder adheres to the surface of each drying medium to form a powder aggregate layer. The flow of hot air causes flowing or vibration of drying media on which the powder aggregate layer is formed. Thus, the individual pieces of drying media collide or rub against each other. The powder aggregate layers adhering to the surfaces of the drying media are pulverized. The thus-pulverized masses are blown off by hot air while aggregation is being loosened and then collected. This method can yield, readily and at high efficiency, the forming material powder of a grain size falling within the above-mentioned range. Ceramic media are preferred as the drying media because of their resistance to wear. The ceramic media may be formed predominantly of, for example, alumina, zirconia, or a mixture thereof. Such ceramic media have an advantage in that, even when wear particles thereof mix into the material powder, they serve as a sintering aid component, thereby minimizing the influence of mixing into the material powder.

The hot air passage, where the drying step is performed in the above-mentioned process for preparing the forming material powder, may include a hot air duct disposed vertically. The hot air duct includes a dry media holder, which is located at an intermediate position of the hot air duct and includes a gas pass body, such as mesh, adapted to permit passage of hot air and adapted not to permit passage of the drying media. The slurry can be fed, from above through effect of gravity, to the dry media aggregate held on the dry media holder. Hot air is allowed to flow through the hot air duct upward from underneath the dry media aggregate while agitating the drying media. The dried powder is conveyed through the hot air duct by means of hot air and is then collected in a downstream collector.

According to the above-described method, the drying media are blown up and agitated by hot air supplied from underneath and fall on the dry media aggregate. The drying media undergo this cycle of motion repeatedly, thereby exerting impact on powder aggregate layers formed on the drying media, efficiently and in a relatively uniform manner. Among thus-pulverized aggregate particles, coarse particles are not blown off by hot air but fall again on the dry media aggregate and undergo pulverization, thereby suppressing generation of coarse secondary particles which might cause biased distribution of powder within a green body formed in the subsequent forming process.

Preferably, rolling granulation is performed by the steps of placing the forming material powder and forming nuclei in a granulation container; and rolling the forming nuclei within the granulation container so as to cause the forming material powder to adhere to and aggregate on the forming nuclei spherically, thereby yielding spherical green bodies. The forming nuclei roll on, for example, a forming material powder layer within the granulation container such that the forming material powder adheres to and aggregates on the forming nuclei spherically, to thereby yield spherical green bodies. This forming process greatly enhances the density of an aggregate layer of the forming material growing on a forming nucleus, and yields the effect that the formed aggregate layer becomes unlikely to suffer defects, such as pores or cracks, which would otherwise result from, for example, bridging of powder particles. Notably, rotating the granulation container is a simple method for rolling forming nuclei (or growing green bodies). However, for example, through utilization of a principle similar to that of a vibration type barrel polishing apparatus, vibration may be applied to the granulation container so as to excite rolling of the forming nuclei through vibration.

In this case, a ceramic ball obtained through firing has a core portion formed at a central portion in a distinguishable manner from an outer layer portion as observed on a cross section taken substantially across the center of the ball. Herein, the term "distinguishable" encompasses not only a visually distinguishable case but also a case where the core portion is distinguishable from the outer layer portion through measurement of difference in certain physical properties (for example, density and hardness).

Through attainment of the above microstructure of a sintered body, a spherical ceramic sintered body exhibits high density, high hardness, and low fraction defective at a surface layer portion, which is a key to enhancement of performance of, for example, a bearing. Specifically, through firing of the above-mentioned spherical green body manufactured by the method of the present invention, an obtained spherical ceramic sintered body is, for example, such that a core portion derived from a forming nucleus is formed at a central portion of the ball distinguishably from an outer layer portion derived from an aggregate layer, which is highly dense and contains few defects, when a polished cross section taken substantially across the center of the ball is observed in an enlarged manner.

An embodiment of the present invention will next be described with reference to an example process for production of ceramic balls for a bearing which contain a constituent ceramic formed of a composite ceramic in which an electrically conductive inorganic compound phase is dispersed in silicon nitride ceramic serving as a ceramic matrix. A material powder of silicon nitride preferably has an α phase content of not less than 70%. To the material powder, at least one element selected from the group consisting of rare earth elements and elements belonging to Groups 3A, 4A, 5A, 3B, and 4B is added in an amount of 1% by weight to 10% by weight, preferably 2% by weight to 8% by weight, on the basis of oxide, so as to serve as a sintering aid. These elements may be added not only in the form of oxide, but also in the form of a compound to be converted to oxide in the course of sintering, such as carbonate or hydroxide.

Figure 8:
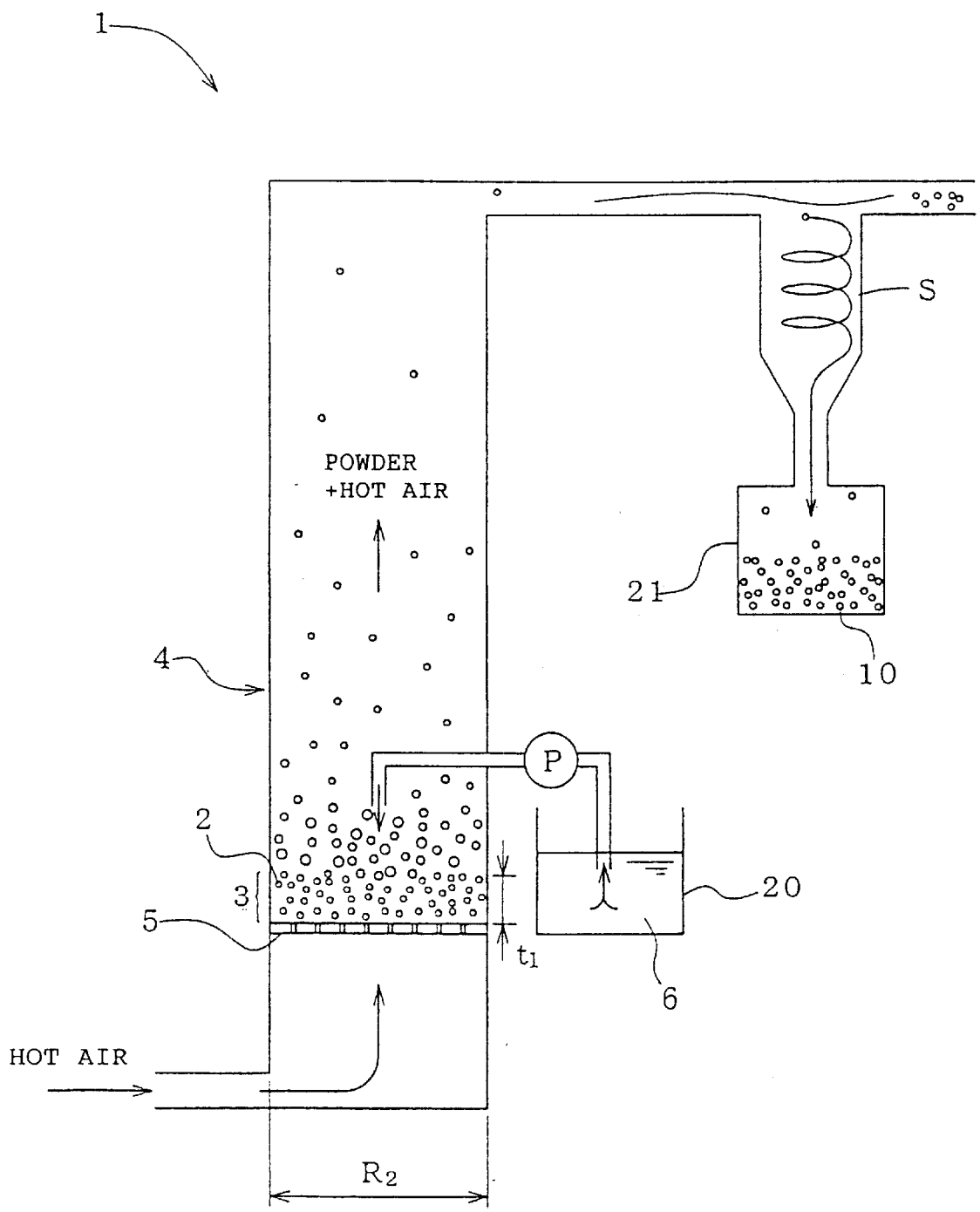
FIG. 8 is a diagrammatic, longitudinal, full sectional view showing an example of apparatus for manufacturing forming material powder.

Next, examples of a method for preparing a forming material powder and a forming method will be described. However, as described above, the present invention is not limited thereto. FIG. 8 shows an embodiment of an apparatus employed in a process for preparing the forming material powder. In the apparatus, a hot air passage 1 includes a vertically disposed hot air duct 4. The hot air duct 4 includes a media holder 5, which is located at an intermediate position of the hot air duct 4 and which includes a gas pass body, such as mesh or a plate having through-holes formed therein, adapted to permit passage of hot air and adapted not to permit passage of drying media 2. The drying media 2 are composed of ceramic balls, which are formed predominantly of alumina, zirconia, or a mixture thereof. The drying media 2 aggregate on the dry media holder 5 to form an aggregation 3 of drying media.

Material is prepared in the form of a slurry which, in turn, is prepared in the following manner. Powder of one or more electrically conductive inorganic compounds selected from among titanium nitride, titanium carbide, titanium boride, tungsten carbide, zirconium nitride, titanium carbide nitride, silicon carbide, and niobium carbide is added to a mixture of silicon nitride powder and sintering aid powder such that the ratio of an electrically conductive inorganic compound phase in a finally obtained composite ceramic becomes 15 to 70% by volume (preferably, 30 to 50% by volume). Further, an aqueous solvent is added to the resultant mixture, which is then wet mixed (or wet mixed and pulverized) by use of a ball mill or attriter, thereby yielding a slurry. Notably, the grain size of primary particles is adjusted such that the BET specific surface area of primary particles becomes 5 $m^2/g$ to 13 $m^2/g$.

Figure 9:
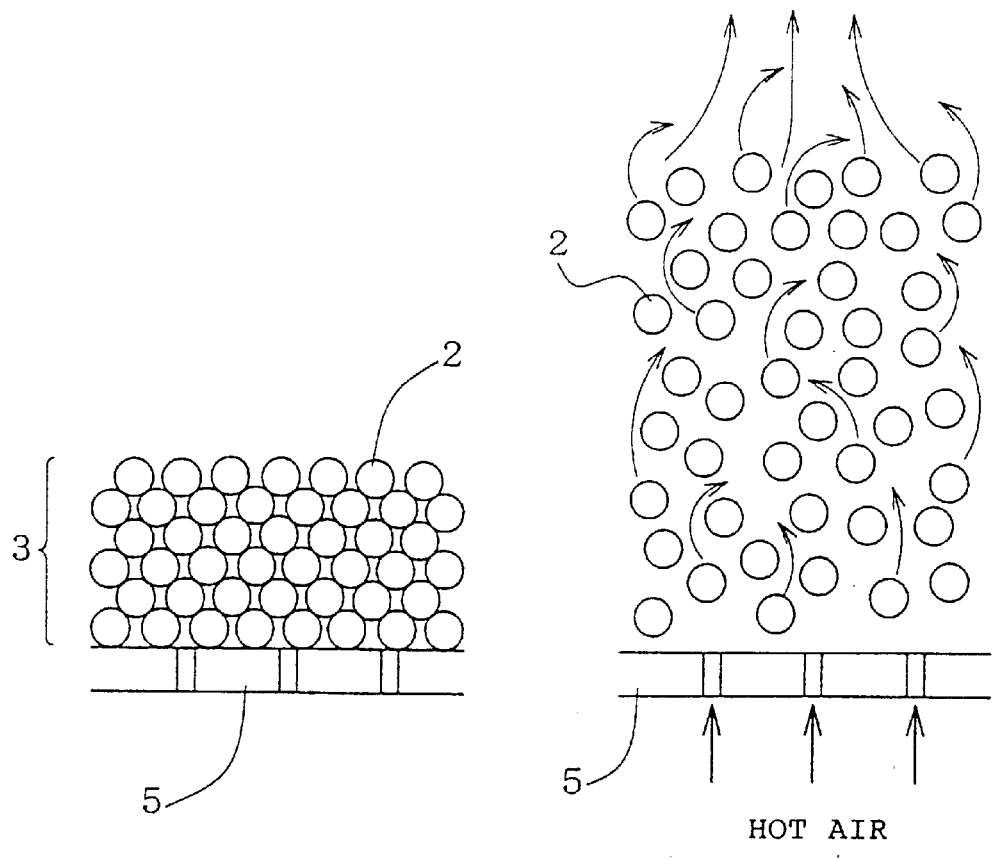
FIG. 9 presents two diagrammatic views showing the action of the apparatus of FIG. 8.
Figure 10:
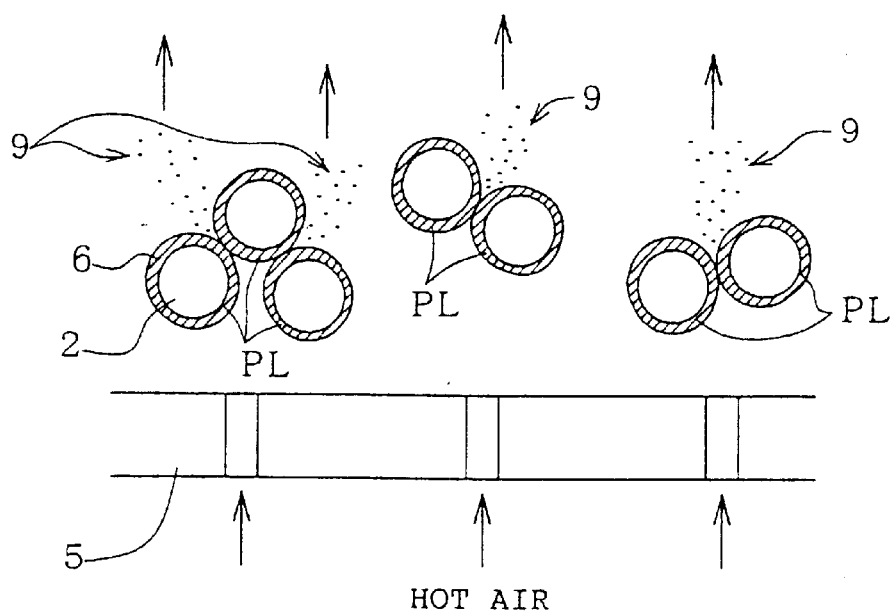
FIG. 10 is a diagrammatic view showing action subsequent to that of FIG. 9.

As shown in FIG. 9, hot air is caused to flow through the dry media aggregate 3 from underneath the dry media holder 5 and to flow upward through the hot air duct 4 while agitating the drying media 2. As shown in FIG. 8, a pump P pumps up a slurry 6 from a slurry tank 20. The slurry 6 is fed to the dry media aggregate 3 from above and through effect of gravity. As shown in FIG. 10, the slurry 6 adheres to the surfaces of the drying media 2 while being dried by hot air, thereby forming a powder aggregate layer PL on the surface of each drying medium 2.

The flow of hot air causes repeated agitation and fall of the drying media 2. Thus, the individual pieces of drying media 2 collide and rub against one another, whereby the powder aggregate layers PL are pulverized into forming material powder particles 9. Some of the forming material powder particles 9 assume the form of a solitary primary particle, but most of the forming material powder particles 9 assume the form of a secondary particle, which is the aggregation of primary particles. The forming material powder particles 9 having a grain size not greater than a certain value are conveyed downstream by hot air (FIG. 8). The forming material powder particles 9 having a grain size greater than a certain value are not blown by hot air, but again fall onto the dry media aggregate 3, thereby undergoing further pulverization effected by the drying media 2.

The forming material powder particles 9 conveyed downstream by hot air pass through a cyclone S and are then collected as forming material powder 10 in a collector 21. The collected forming material powder 10 is prepared so as to have an average grain size of 0.3 to 2 $\mu$m and a 90% grain size of 0.7 to 3.5 $\mu$m as measured by use of a laser diffraction granulometer, as well as a BET specific surface area of 5 to 13 $m^2/g$. Since the definition of 90% grain size is the same as that shown in FIG. 8, its detailed description is omitted.

In FIG. 8, the diameter of the drying medium 2 is determined as appropriate according to the cross-sectional area of the hot air duct 4. If the diameter of the drying medium 2 is insufficient, a sufficiently large impact force will not be exerted on the powder aggregate layers PL formed on the drying media 2. As a result, the forming material powder 10 may fail to have a grain size of a predetermined range. If the diameter of the drying medium 2 is excessively large, the flow of hot air will encounter difficulty in agitating the drying media 2, again causing poor impact force. As a result, the forming material powder 10 may fail to have a predetermined grain size. Preferably, the drying media 2 are substantially uniform in diameter so as to leave an appropriate space thereamong, whereby the motion of the drying media 2 is accelerated during flow of hot air.

A thickness t1 of the drying media 2 of the dry media aggregate 3 is determined such that the drying media 2 move appropriately according to the velocity of hot air. If the thickness t1 is excessively large, the drying media 2 will encounter difficulty in moving, causing poor impact force. As a result, the forming material powder 10 may fail to have a grain size of the predetermined range. If the thickness t1; i.e., the amount of the drying media 2, is excessively small, the drying media 2 will collide less frequently, resulting in impaired processing efficiency.

The temperature of hot air is determined such that the slurry 6 is dried sufficiently and the forming material powder 10 does not suffer any problem, such as thermal deterioration. For example, when a solvent used for preparation of the slurry 6 is composed predominantly of water, hot air having a temperature lower than 100° C. fails to sufficiently dry the fed slurry 6. The resultant forming material powder 10 has an excessively high water content and thus tends to agglomerate. As a result, the forming material powder 10 may fail to have a predetermined grain size.

The velocity of hot air is determined so as not to cause the drying media 2 to fly into the collector 21. If the velocity is excessively low, the drying media 2 will encounter difficulty in moving, resulting in poor impact force. As a result, the forming material powder 10 may fail to have a grain size of the predetermined range. If the velocity is excessively high, the drying media 2 will fly too high, causing reduced frequency of collision. As a result, processing efficiency will decrease.

Figure 2:
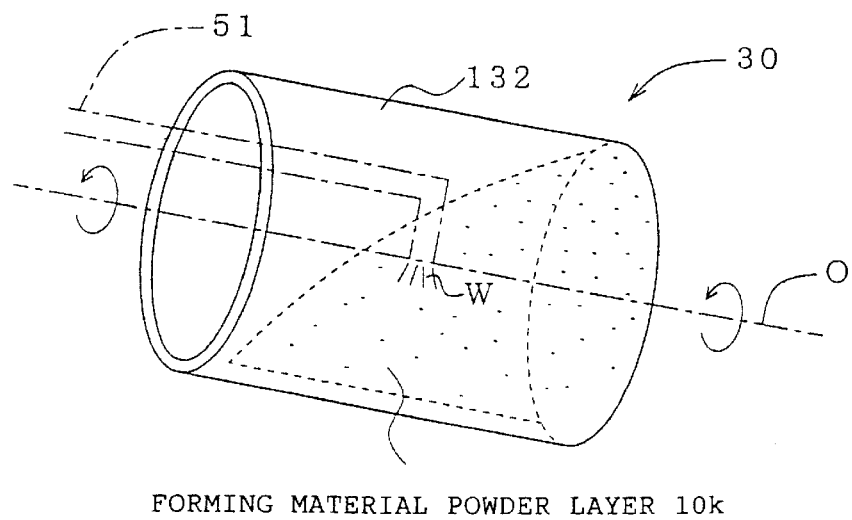
FIG. 2 is a diagrammatic view showing a step of rolling granulation subsequent to the step of FIG. 1.
Figure 5:
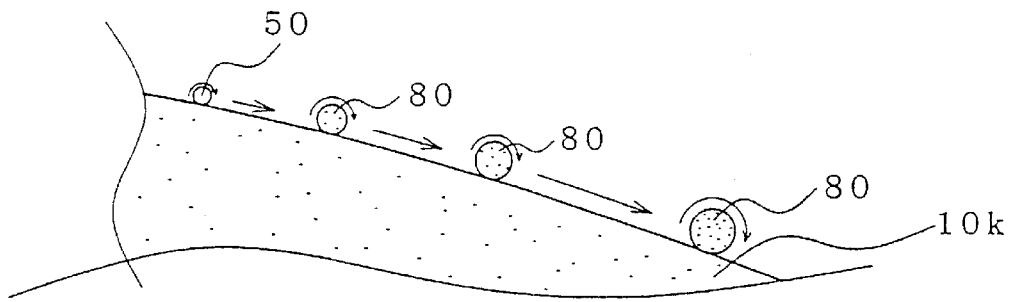
FIGS. 5(a), 5(b), 5(c), 5(d) and 5(e) are diagrammatic views showing a rolling granulation process, depicting the progress of rolling granulation.
Figure 5:
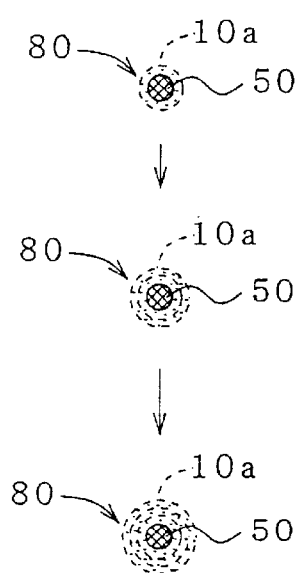
Figure 5:
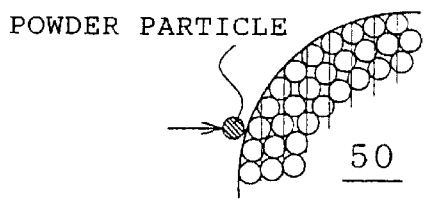
Figure 5:
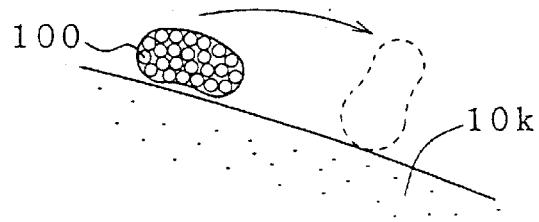
Figure 5:
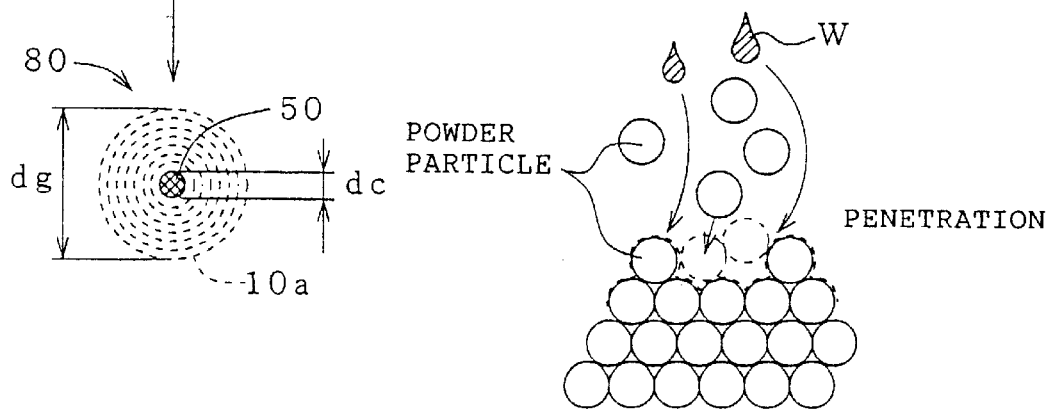

The thus-obtained forming material powder 10 can be formed into spherical bodies by means of the rolling granulation process. Specifically, as shown in FIG. 1, the forming material powder 10 is placed in a granulation container 132. As shown in FIG. 2, the granulation container 132 is rotated at a constant peripheral speed. Water W is fed to the forming material powder 10 contained in the granulation container 132, through, for example, spraying. As shown in FIG. 5, the charged forming material powder 10 rolls down an inclined powder layer 10k formed in the rotating granulation container 132 to thereby spherically aggregate into a green body 80. The operating conditions of a rolling granulation apparatus 30 are adjusted such that the obtained green body 80 assumes a relative density of not lower than 61%. Specifically, the rotational speed of the granulation container 132 is adjusted to 10 to 200 rpm. The water feed rate is adjusted such that the finally obtained green body 80 assumes a water content of 10 to 20% by weight. Through use of the forming material powder 10 which contains the aforementioned sintering aid powder in an amount of 1 to 10% by weight, the density of the green body can be made to about 2.0 to 2.5 $g/cm^3$ under the above-described conditions. Such density can be achieved sufficiently even in the case of a green body of small diameter (e.g., 6.73 mm or less) in which the ratio A'/W' is 350 or greater, where A' is the surface area of the green body G and W' is the weight of the green body G. When this green body 80 is fired, there can be obtained an unfinished bearing ball whose A/W ratio (A: surface area, W: weight) is 300 or greater (diameter: 6.35 mm or less; e.g., 5 mm or less).

Figure 6:
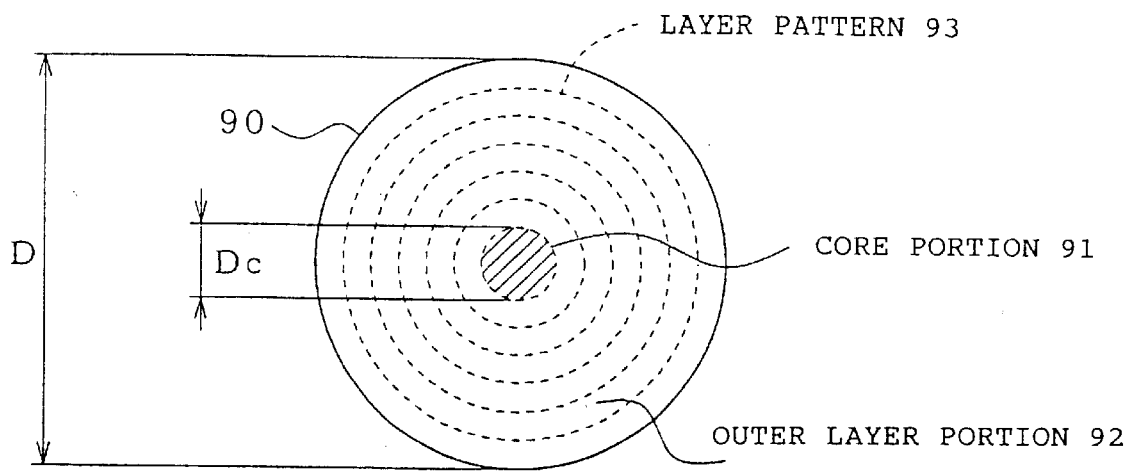
FIG. 6 is a schematic view showing the cross-sectional structure of a spherical ceramic sintered body manufactured through rolling granulation.

In order to accelerate the growth of the green body 80 during rolling granulation, as shown in FIG. 1, preferably, forming nuclei 50 are placed in the granulation container 132. While the forming nucleus 50 is rolling down the forming material powder layer 10k as shown in FIG. 5(a), the forming material powder 10 adheres to and aggregates on the forming nucleus 50 spherically, as shown in FIG. 5(b), to thereby form the spherical green body 80 (rolling granulation process). The green body 80 is sintered to thereby become an unfinished bearing ball 90 as shown in FIG. 6.

Figure 3:
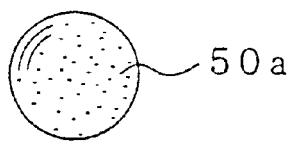
FIGS. 3(a), 3(b), 3(c), 3(d) and 3(e) are diagrammatic views showing several examples of a green body.
Figure 3:
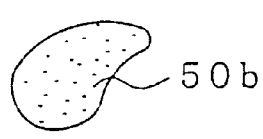
Figure 3:
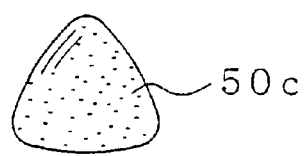
Figure 3:
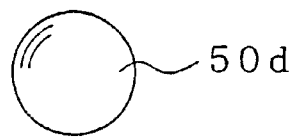
Figure 3:
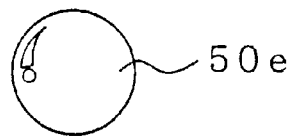

Preferably, the forming nucleus 50 is formed predominantly of ceramic powder as represented by a forming nucleus 50a shown in FIG. 3(a); for example, the forming nucleus 50 is formed of a material having composition similar to that of the forming material powder 10 (however, a ceramic powder different from the ceramic powder (inorganic material powder) constituting predominantly the forming material powder 10 may be used). This is because the nucleus 50a is unlikely to act as an impurity source on the finally obtained ceramic ball 90. However, when there is no possibility of a nucleus component diffusing to a surface layer portion of the ceramic ball 90, the nucleus 50 may be formed of a ceramic powder different from the ceramic powder (inorganic material powder) constituting predominantly the forming material powder 10; alternatively, the nucleus 50 may be a metal nucleus 50d shown in FIG. 3(d) or a glass nucleus 50e shown in FIG. 3(e). Also, the nucleus 50 may be formed of a material which disappears through thermal decomposition or evaporation during firing; for example, the nucleus 50 may be formed of a polymeric material, such as wax or resin. The forming nucleus 50 may assume a shape other than sphere, as shown in FIG. 3(b) or 3(c). Preferably, the forming nucleus 50 assumes a spherical shape, as shown in FIG. 3(a), in order to enhance the sphericity of a green body to be obtained.

Figure 4:
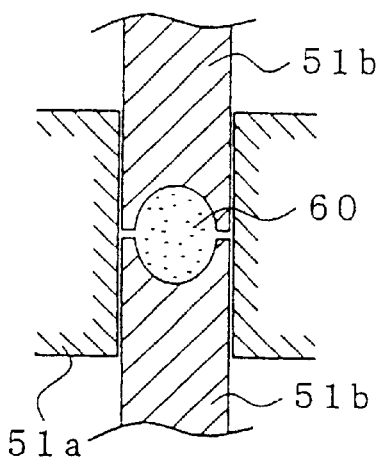
FIGS. 4(a), 4(b), 4(c), 4(d) and 4(e) are diagrammatic views showing several examples of a method for manufacturing a green body.
Figure 4:
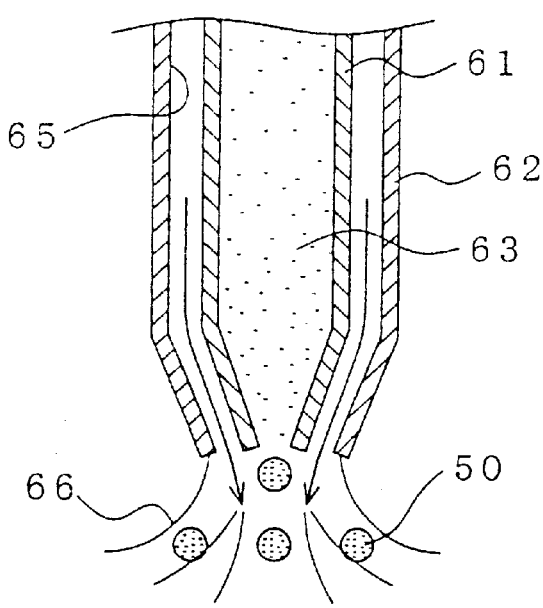
Figure 4:
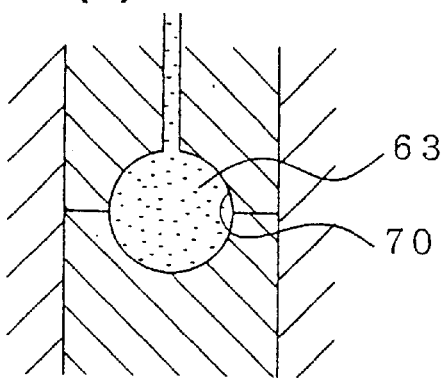
Figure 4:
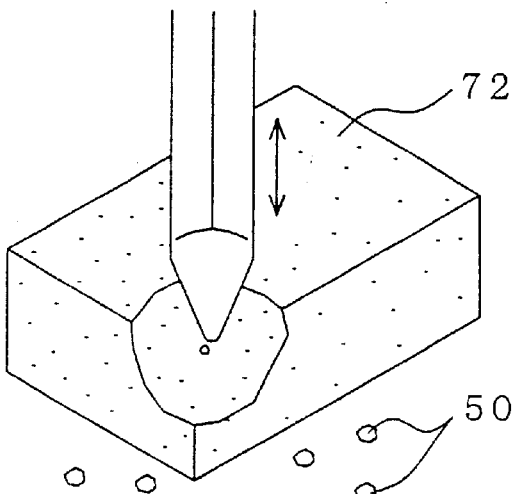
Figure 4:
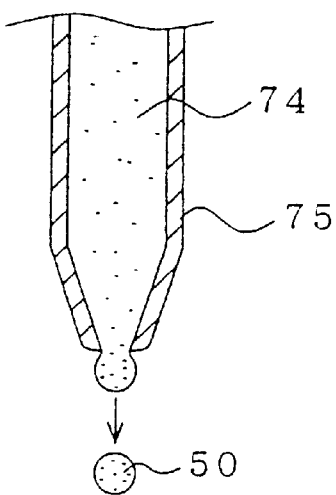

A method for manufacturing the forming nuclei 50 is not particularly limited. When the forming nuclei 50 are composed predominantly of ceramic powder, for example, various methods as shown in FIG. 4 can be employed. According to the method shown in FIG. 4(a), a ceramic powder 60 is compacted by means of a die 51a and press punches 51b (other compression means may be used instead), thereby obtaining the nucleus 50. According to the method shown in FIG. 4(b), ceramic powder is dispersed into a molten thermoplastic binder to obtain a molten compound 63, and the thus-obtained molten compound 63 is sprayed and solidified, thereby obtaining the nuclei 50. According to the method shown in FIG. 4(c), the molten compound 63 is injected into a spherical cavity formed in an injection mold, thereby molding the spherical nucleus 50. According to the method shown in FIG. 4(e), the molten compound 63 is caused to fall freely from a nozzle so as to assume a spherical shape by means of surface tension effect, and the thus-formed spherical droplet is cooled and solidified in the air to become the nucleus 50. Alternatively, slurry is formed from material powder, a monomer (or a prepolymer) and a dispersant solvent. The slurry is dispersed in a liquid which does not mix with the slurry, so as to assume the form of globules in the liquid. Then, the monomer or prepolymer is polymerized, thereby obtaining spherical bodies, which serve as the nucleus 50. Alternatively, the forming material powder 10 is singly placed in the granulation container 132, and the granulation container 132 is rotated at a speed lower than that for growing the green body 80 (see FIG. 2), so as to form powder aggregates. When powder aggregates of sufficiently large size are generated in a sufficient amount, the rotational speed of the aggregation container 132 is increased to thereby grow the green bodies 80 while utilizing the aggregates as the nuclei 50. In this case, there is no need to place the nuclei 50 manufactured in a separate process, in the granulation container 132 together with the forming material powder 10.

The thus-obtained forming nucleus 50 does not collapse and can stably maintain the shape even when some external force is imposed thereon. Thus, when the nucleus 50 rolls down the forming material powder layer 10k as shown in FIG. 5(a), the nucleus 50 can reliably sustain reaction induced from its own weight. Conceivably, since powder particles which are caught on the rolling nucleus 50 can be firmly pressed on the surface of the nucleus 50 as shown in FIG. 5(e), the powder particles are appropriately compressed to thereby grow into a highly dense aggregate layer 10a. Notably, rolling granulation can be performed without use of nuclei. As shown in FIG. 5(d), since an aggregate 100 corresponding to a nucleus is rather loose and soft at the initial stage of formation, lowering the rotational speed of the granulation container 132 is preferable in order to prevent occurrence of defect.

The size of the nucleus 50 is at least approximately 40 $\mu$m (preferably, approximately 80 $\mu$m). When the nucleus 50 is too small, the growth of the aggregate layer 10a may become incomplete. When the nucleus 50 is too large, the thickness of the aggregate layer 10a to be formed becomes insufficient; as a result, a sintered body tends to suffer occurrence of defect. Preferably, the size of the nucleus 50 is, for example, not greater than 1 mm.

Preferably, the forming nucleus 50 assumes the form of an aggregate of ceramic powder having a density higher than the bulk density (for example, apparent density prescribed in JIS Z2504 (1979)) of the forming material powder 10. Such an aggregate of ceramic powder can reliably sustain the pressing force of powder particles to thereby accelerate the growth of the aggregate layer 10a. Specifically, an aggregate of ceramic powder having a density at least 1.5 times the bulk density of the forming material powder 10 is preferred. In this case, sufficient aggregation is such that, when an aggregate rolls down the forming material powder layer 10k, the aggregate does not collapse from the shock of rolling.

In order to grow the green body 80 more stably, preferably, the size of the nucleus 50 is determined according to the size of the green body 80 in the following manner. As shown in FIG. 5(b), the size of the forming nucleus 50 is represented by the diameter dc of a sphere having a volume equal to that of the nucleus 50 (when the nucleus 50 is spherical, the diameter thereof is the size in question), and the diameter of the finally obtained spherical green body 80 is represented by dg. The diameter dc is determined such that dc/dg is 1/100 to 1/2. When dc/dg is less than 1/100, the nucleus 50 becomes too small, potentially causing insufficient growth of the aggregate layer 10a or occurrence of many defects in the aggregate layer 10a. When dc/dg is in excess of 1/2, and the density of the nucleus 50 is not sufficiently high, the strength of a sintered body to be obtained may become insufficient. The ratio dc/dg is preferably 1/50 to 1/5, more preferably 1/20 to 1/10. The size dc of the forming nucleus 50 is preferably 20–200 times the average grain size of the forming material powder 10. Preferably, the absolute value of the size dc is, for example, 50 to 500 $\mu$m.

When the green bodies 80 are fired by a method which will be described later, there can be obtained unfinished balls of a composite ceramic (hereinafter may be simply referred to as "unfinished balls") in which an electrically conductive inorganic compound phase is dispersed in silicon nitride ceramic in an amount of 15 to 70% by volume (preferably, 30 to 50% by volume). In the present specification, the content of the electrically conductive inorganic compound phase represented by % by volume is considered to be approximately equal to the ratio of an area of the electrically conductive inorganic compound phase in a polished cut surface of the composite ceramic. The firing may be a gas pressure firing in which firing is performed in an atmosphere containing at least nitrogen at a pressure of greater than 1 atm but not greater than 200 atm, or an ambient pressure firing in which firing is performed in an atmosphere containing at least nitrogen at a pressure of 1 atm or less. The firing temperature is preferably set in a range of 15000 to 1800° C. When the firing temperature is lower than 1500° C., defects such as pores cannot be eliminated, which results in a reduction in strength. Firing temperatures higher than 1800° C. are not preferred, because the strength of a sintered body decreases with grain growth. The firing may be two stage firing including primary firing and secondary firing. In this case, the primary firing is preferably performed at a temperature of 1800° C. or lower in a non-oxidizing atmosphere containing nitrogen at ambient pressure or a pressure of 10 atm or less, such that the relative density of a sintered body having undergone the primary firing becomes 78% or higher, preferably, 90% or higher. When the relative density of a sintered body having undergone the primary firing is less than 78%, a large number of defects such as pores tend to remain after the secondary firing, which is not preferred. The secondary firing can be performed at a temperature of 15000 to 1800° C. in a non-oxidizing atmosphere containing nitrogen at ambient pressure or a pressure of 200 atm or less. When the pressure during firing exceeds 200 atm, the surface hardness of a resultant unfinished ball or sintered body increases, which makes machining such as polishing difficult, with the result that dimensional accuracy of product balls cannot be secured.

Since the relative density of the green body was increased to 61% or higher by the above-described rolling granulation method, an unfinished ball obtained through sintering becomes highly dense, so that defects, such as pores, become unlikely to remain in a surface layer portion of the unfinished ball. The unfinished ball undergoes rough polishing for dimensional adjustment and then undergoes fine polishing, which is performed by use of stationary abrasive grains. Thus is obtained the ceramic ball of the present invention. The ceramic ball can assume the feature that the cumulative area percentage of defects each having a size of not less than 1 µm as observed on the polished surface is not greater than 1% and that the average number of the defects present in a unit area of 1 mm² on the polished surface is not greater than 500. Also, the ceramic ball can assume an arithmetic average roughness Ra of not greater than 0.012 µm as observed on the polished surface, and a sphericity of not greater than 0.08 µm. Furthermore, diametral irregularity among the ceramic balls can be not greater than 0.10 µm.

The unfinished ball 90 obtained through firing of the spherical green body 80 which, in turn, is obtained by means of the rolling granulation process has the structure shown in FIG. 6, which is an enlarged schematic view showing a polished cross section taken substantially across the center of the ball 90. Specifically, a core portion 91 derived from the forming nucleus 50 is formed at a central portion of the unfinished ball 90 distinguishably from an outer layer portion 92, which is derived from the aggregate layer 10a and features high density and few defects. In many cases, the core portion 91 exhibits a visually distinguishable contrast with the outer layer portion 92 with respect to at least brightness or color tone. Conceivably, such contrast is exhibited because of difference between ceramic density ρe of the outer layer portion 92 and ceramic density ρc of the core portion 91. For example, when the forming nucleus 50 (FIG. 5) is lower in density than the aggregate layer 10a, the ceramic density ρe of the outer layer portion 92 becomes higher than the ceramic density ρc of the core portion 91 in many cases. As a result, the color tone of the outer layer portion 92 becomes brighter than that of the core portion 91. In view of attainment of appropriate strength and durability of ceramic, the relative density of the outer layer portion 92 is not lower than 99%, preferably not lower than 99.5%. In any case, through attainment of such a sintered body structure that the above-mentioned structural feature appears on a polished cross section, there can be realized a spherical ceramic sintered body featuring high density, high strength, and low fraction defective (for example, to such an extent that no pore is observed) at the surface layer portion 92, which is a key to enhancement of performance of, for example, a bearing. In the case where firing has proceeded uniformly, a resultant sintered body may exhibit substantially uniform density in a radial direction from a surface layer portion to a central portion. Alternatively, even when the core portion 91 and the outer layer portion 92 differ in color tone or brightness, almost no difference may exist in density therebetween. In the case where firing has proceeded in a highly uniform manner, concentric contrast patterns may not be visually observed at the core portion 91 or at the outer layer portion 92.

When dc/dg is adjusted to 1/100 to 1/2 (preferably 1/50 to 1/5, more preferably 1/20 to 1/5), where, as shown in FIG. 5(b), dc is the diameter of the forming nucleus, and dg is the diameter of an unfinished ball obtained through firing, the cross section of the sintered body 90 shown in FIG. 6 assumes such a structure that Dc/Dg is 1/100 to 1/2 (preferably 1/50 to 1/5, more preferably 1/20 to 1/10), where Dc is the diameter of a circle having an area equal to that of the core portion 91 (when the nucleus 50 is formed of a material which disappears through thermal decomposition or evaporation during firing; for example, wax, resin, or like polymeric material, the core portion 91 becomes a void portion), and Dg is the diameter of the ceramic sintered body. When Dc/Dg is less than 1/50, the aggregate layer 10a (FIG. 5), which becomes the outer layer portion 92, tends to suffer occurrence of defects, potentially resulting in insufficient strength. When Dc/Dg is in excess of 1/5, and, for example, the density of the nucleus 50 is not very high, the strength of the sintered body may become insufficient. Dc/Dg is preferably 1/20 to 1/10.

Figure 7:
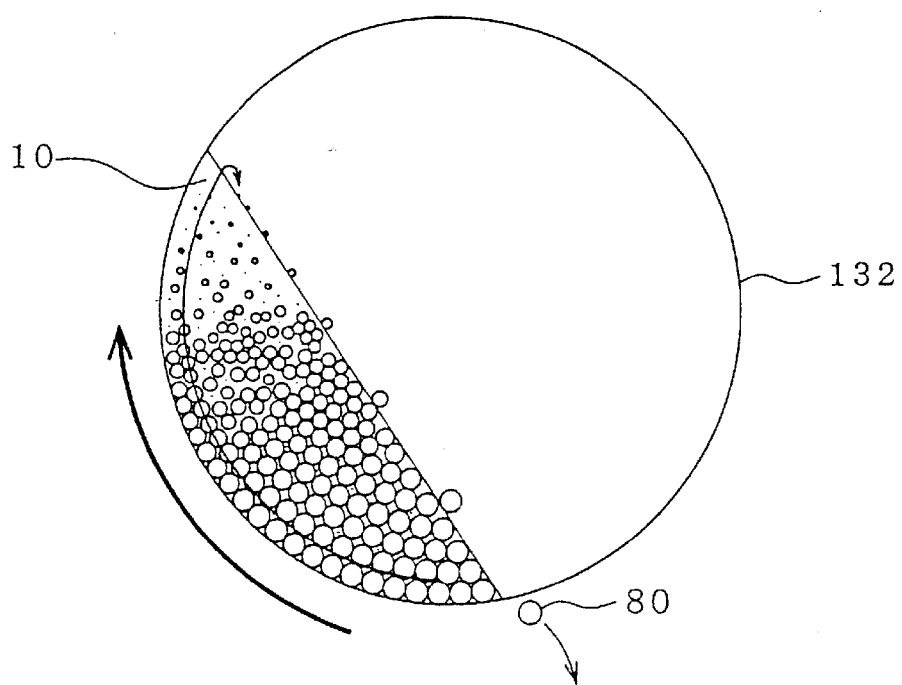
FIG. 7 is a diagrammatic view showing rolling granulation.

An example of visually distinguishable contrast between the core portion 91 and the outer layer portion 92 in the unfinished ball 90 is the state in which brightness or color tone differs in the radial direction of the ball 90 while being unchanged in the circumferential direction. Specifically, a concentric layer pattern is formed in the outer layer portion 92 in such a manner as to surround the core portion 91 as observed on the polished cross section of the unfinished ball 90. This is a typical structural feature (which is applied to a polished ceramic ball accordingly) as observed in employment of the rolling granulation process. Conceivably, the structural feature arises for the following reason. As shown in FIG. 5(a), while the green body 80 is rolling down the forming material powder layer 10k, the aggregate layer 10a grows. However, during rolling granulation, the green body 80 is not always present on the forming material powder layer 10k. That is, as shown in FIG. 7, since the forming material powder 10 slides like avalanche as the granulation container 132 rotates, the green body 80 which has reached the lower end portion of the slope of the forming material powder layer 10k is caught into the forming material powder layer 10k. Then, the green body 80 is brought up along the wall surface of the granulation container 132 to an upper end portion of the slope of the forming material powder layer 10k. The green body 80 again rolls down the forming material powder layer 10k. When the green body 80 is caught in the forming material powder layer 10k, the green body 80 is pressed by the surrounding forming material powder 10, and is thus less susceptible to impact associated with a rolling down motion. As a result, powder particles adhere to the green body 80 in a relatively loose manner. By contrast, when the green body 80 rolls down the forming material powder layer 10k, the green body 80 is subjected to impact associated with a rolling down motion and is susceptible to the spray of liquid spray medium W, such as water. As a result, powder particles adhere to the green body 80 in a relatively tight manner. Since the green body 80 rolls down and is caught into the forming material powder layer 10k cyclically, the state of adhesion of powder varies cyclically. Accordingly, the aggregate layer 10a, which is formed of adhering powder particles, involves repetitions of condensation and rarefaction in the radial direction. Even after sintering, the repetitions of condensation and rarefaction emerge in the form of delicate difference in density, thereby forming a layer pattern 93 (when the difference between condensation and rarefaction is very small, the actual occurrence of condensation and rarefaction may not be observed by means of ordinary density measurement, since the precision of the measurement is not sufficiently high). Conceivably, for example, the layer pattern 93 is composed of concentric spherical portions of different densities, which are alternately arranged in layers.

Figure 13:
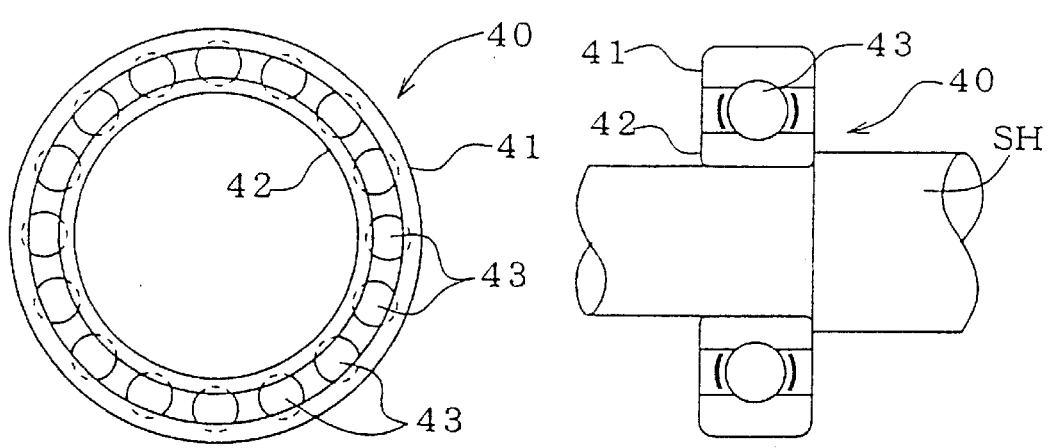
FIG. 13 are front and side elevational views showing a ball bearing incorporating ceramic balls of the present invention.

As shown in FIG. 13, ceramic balls 43 obtained as above are incorporated between an inner ring 42 and an outer ring 41, which are made of, for example, metal or ceramic, thereby yielding a radial ball bearing 40. When a shaft SH is fixedly attached to the internal surface of the inner ring 42 of the ball bearing 40, the ceramic balls 43 are supported rotatably or slidably with respect to the outer ring 41 or the inner ring 42. The ceramic ball 43 has a relatively high electrical conductivity (electrical resistivity: 106 Ω·cm or less), because the silicon nitride ceramic matrix contains an electrically conductive inorganic compound phase in an amount of 15 to 75% by volume (preferably, 30 to 50% by volume). As a result, electrification of the ceramic ball 43 is prevented or effectively suppressed. For example, during handling of a lot of produced ceramic balls, balls are hardly attracted to a container or the like by the action of static electricity, so that the smooth process flow can be maintained. Further, even when the ceramic ball is built into the ball bearing 40 and is used, foreign substances such as dust do not adhere to the ball due to the action of static electricity, so that generation of abnormal noise or vibration can be suppressed considerably even at high speed rotation.

It is to be noted that the above-described ceramic ball for a bearing can be manufactured in the same manner, even when the ceramic matrix is formed of zirconia ceramic or alumina ceramic.

Figure 14:
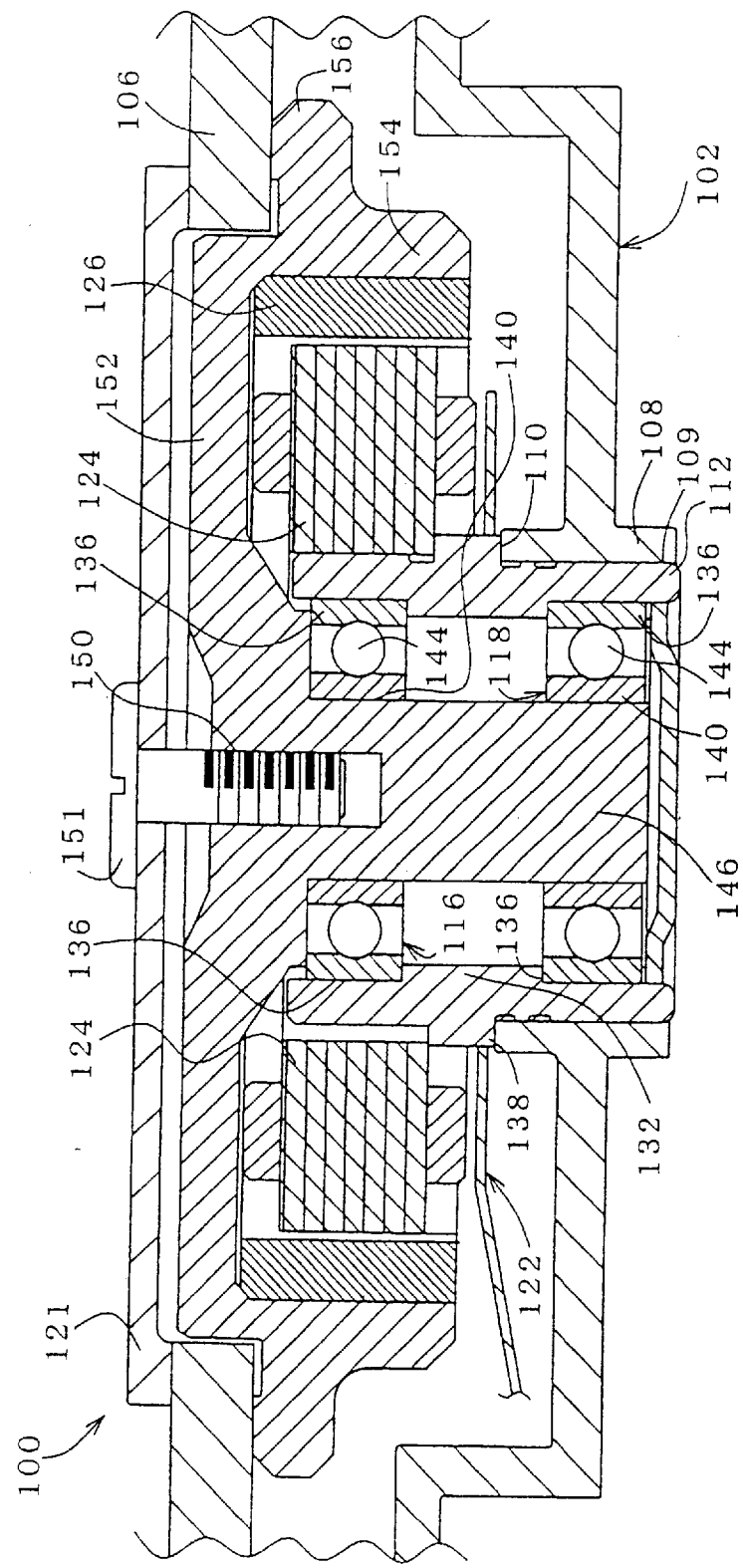
FIG. 14 is a full, sectional view of a hard disk drive mechanism for computer use incorporating the ball bearing of FIG. 13.

FIG. 14 is a longitudinal sectional view showing an example of configuration of a hard disk drive using the above-mentioned ball bearing. The hard disk drive 100 includes a body casing 102; a cylindrical shaft holder portion 108 formed at the center of the bottom of the body casing 102 in a vertically standing condition; and a cylindrical bearing holder bushing 112 coaxially fitted to the shaft holder portion 108. The bearing holder bushing 112 has a bushing fixation flange 110 formed on the outer circumferential surface thereof and is axially positioned while the bushing fixation flange 110 abuts one end of the shaft holder portion 108. Ball bearings 116 and 118 configured in the same manner as shown in FIG. 13 are coaxially fitted into the bearing holder bushing 112 at the corresponding opposite end portions of the bushing 112 while abutting the corresponding opposite ends of a bearing fixation flange 132 projecting inward from the inner wall of the bearing holder bushing 112 to thereby be positioned. The ball bearings 116 and 118 are configured such that a plurality of ceramic balls 144 of the present invention are disposed between an inner ring 140 and an outer ring 142.

A disk rotating shaft 146 is fixedly fitted into the inner rings 140 of the ball bearings 116 and 118 to thereby be supported by the ball bearings 116 and 118 in a rotatable condition with respect to the bearing holder bushing 112 and the body casing 102. A flat, cylindrical disk fixation member (rotational member) 152 is integrally formed at one end of the disk rotating shaft 146. A wall portion 154 is formed along the outer circumferential edge of the disk fixation member in a downward extending condition. An exciter permanent magnet 126 is attached to the inner circumferential surface of the wall portion 154. A field coil 124 fixedly attached to the outer circumferential surface of the bearing holder bushing 112 is disposed within the exciter permanent magnet 126 in such a manner as to face the exciter permanent magnet 126. The field coil 124 and the exciter permanent magnet 126 constitute a DC motor 122 for rotating the disk. A disk fixation flange 156 projects outward from the outer circumferential surface of the wall portion 154 of the disk fixation member 152. An inner circumferential edge portion of a recording hard disk 106 is fixedly held between the disk fixation flange 156 and a presser plate 121. A clamp bolt 151 is screwed into the disk rotating shaft 146 while extending through the presser plate 121.

When the field coil 124 is energized, the motor 122 starts rotating to thereby generate a rotational drive force while the disk fixation member 152 serves as a rotor. As a result, the hard disk 106 fixedly held by the disk fixation member 152 is rotated at a high speed of, for example, 5400 to 15,000 rpm about the axis of the disk rotating shaft 146 supported by the bearings 116 and 118. In order to secure a sufficiently long service life even at such high speed rotation, ceramic balls used for the bearings 116 and 118 are preferably formed of a composite ceramic in which the ceramic matrix is formed of silicon nitride ceramic or zirconia ceramic.

Figure 15:
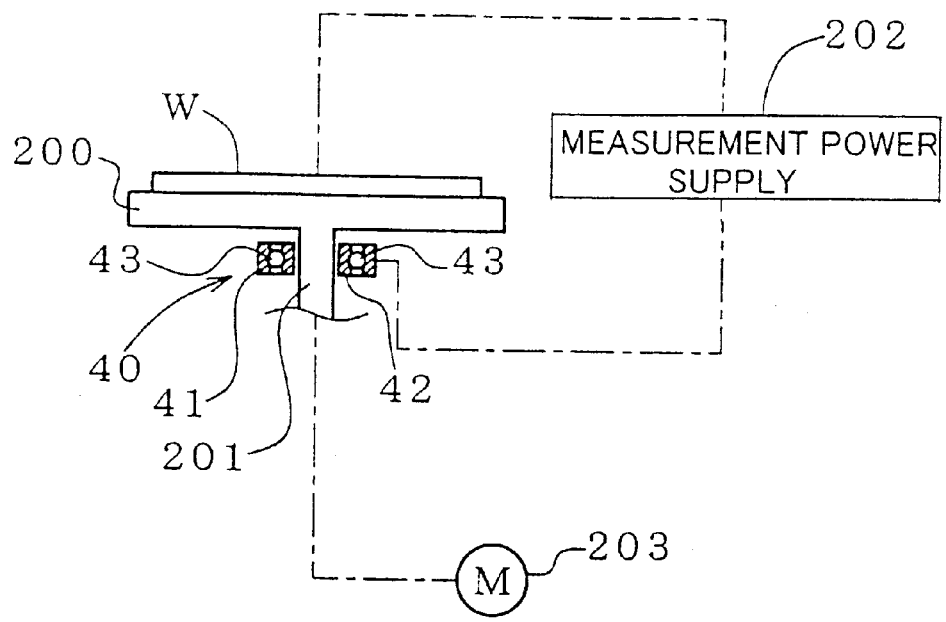
FIG. 15 is a schematic view showing an example of an electrical measurement apparatus utilizing the ball bearing of FIG. 13.

FIG. 15 shows an apparatus for measuring the flatness of a semiconductor wafer (e.g., a silicon wafer). In the apparatus, while a rotary measurement table 200 carrying a wafer W is rotated, electricity is applied between the wafer W and the rotary measurement table 200 in order to measure an electrostatic capacitance, on the basis of which the flatness of the wafer W is evaluated. The rotary table 200 is rotated by a motor 203 via a shaft 201, and the above-described ball bearing 40 is used as a radial bearing for the shaft 201. Electricity is supplied from a measurement power supply 202 to the rotary measurement table 200 via the bearing 40 and the shaft 201, which form a conduction path. In this case, since the rotary table 200 is not rotated at high speed as compared with the above-described hard disk drive, alumina ceramic which is slightly lower in durability but is inexpensive can be used as a matrix of a composite ceramic which constitutes the balls. However, in order to secure electrical conductivity necessary for forming a conduction path, the electrical resistivity of the constituent ceramic of the balls is preferably set to 105 Ω·cm or less, and the content of the electrically conductive inorganic compound phase is preferably set to 15 to 50% by volume. It is to be noted that in place of a composite ceramic, ceramic which is obtained through sintering a single component conductive ceramic such as silicon carbide and a sintering agent may be used in order to produce balls.

In order to confirm the effects of the present invention, the following experiment was conducted. Powders listed below were prepared as powder for forming a ceramic matrix (hereinafter referred to as "matrix powder").

Sample 1:
Mixture of 100 parts by weight of silicon nitride powder (average grain size: 0.5 µm), 3 parts by weight of yttria powder (average grain size: 0.6 µm), and 3 parts by weight of alumina (average grain size: 0.2 µm).

Sample 2:

Mixture of 100 parts by weight of silicon nitride powder (average grain size: identical to that in (1)), 3 parts by weight of magnesium carbonate (first class grade chemical), 2 parts by weight of zirconium oxide (average grain size: 2 μm), 2 parts by weight of cerium oxide (average grain size: 1.5 μm), and 1 part by weight of alumina (average grain size: 0.2 μm).

Sample 3:

Mixture of 100 parts by weight of alumina powder (alumina purity: 99.7% by weight, average grain size: 0.4 μm), and 0.1 parts by weight of MgO powder (first class grade chemical) serving as a sintering aid.

Sample 4:

Zirconia powder (containing 3.6% by weight of yttria as a stabilizer, average grain size: 1.1 μm).

Further, titanium nitride (TiN, average grain size: 1.1 μm) was prepared as powder of an electrically conductive compound.

Powder of titanium nitride was mixed into each of the matrix powders (1) through (4), such that the content of a titanium nitride phase, which is an electrically conductive inorganic compound phase, within the ceramic matrix is to become about 30% by volume ultimately. Pure water (50 parts by weight) serving as a solvent and an organic binder (proper amount) were added to the mixture (100 parts by weight), which was then mixed for 10 hours by use of an attriter mill, to thereby obtain a slurry of each forming material powder. By use of the apparatus shown in FIG. 8, each forming material powder was obtained from the corresponding slurry. The thus obtained powders are referred to as forming material powders (1) through (4), corresponding to the matrix powders (1) to (4).

The average grain size of each of the forming material powders (1) through (4) was measured by use of a laser diffraction granulometer (product of Horiba Ltd., Model: LA-500), and the BET specific surface area of each of the forming material powers (1) to (4) was measured by use of a BET-specific-surface-area measurement apparatus (product of Yuasa Ionics Inc., Multisorb 12). The results of measurement are as follows.

Sample 1:

50% grain size: 0.7 μm, 90% grain size: 1.5 μm, BET specific surface area: 11 m$^2$/g.

Sample 2:

50% grain size: 0.3 μm, 90% grain size: 0.7 μm, BET specific surface area: 10 m$^2$/g.

Sample 3:

50% grain size: 0.9 μm, 90% grain size: 1.2 μm, BET specific surface area: 11 m$^2$/g.

Sample 4:

50% grain size: 0.1 μm, 90% grain size: 0.7 μm, BET specific surface area: 13 m$^2$/g.

Subsequently, each of the forming material powders (1) through (4) was subjected to rolling granulation to thereby produce spherical green bodies having a diameter of about 2.5 mm. The thus-obtained spherical green bodies were fired under the following conditions.

Sample forming material powders (1) and (2): firing was performed for 3 hours at 1700° C. in an N$_2$ atmosphere of 100 atm.

Sample forming material powders (3): firing was performed for 5 hours at 1650° C. in a normal pressure atmosphere.

Sample forming material powder (4): firing was performed for 2 hours at 1500° C. in an argon gas atmosphere of 1000 atm.

The surfaces of fired balls were polished precisely such that sphericity became 0.08 μm, and arithmetic average roughness became 0.012 μm, to thereby obtain bearing ceramic balls having a diameter of 2 mm and formed of a silicon-nitride-based composite ceramic, those formed of an alumina-based composite ceramic, and those formed of a zirconia-based composite ceramic. The electrical resistivity of each ball were measured at the surface by a DC four probe method. The electrical resistivity of the balls formed of the silicon-nitride-based composite ceramic was 20 Ω·cm, the electrical resistivity of the balls formed of the alumina-based composite ceramic was 50 Ω·cm, and the electrical resistivity of the balls formed of the zirconia-based composite ceramic was 7×10$^{-3}$ Ω·cm. The balls of each type were not electrified by static electricity and therefore were able to be handled smoothly during production thereof. Further, bearing balls having been polished were disposed between outer and inner rings formed of a metal in order to constitute a bearing as shown in FIG. 13. Subsequently, after a microphone (pick-up sensor) was attached to the outer ring, the inner ring was rotated at 10000 rpm, with the outer ring fixed, and generated sound was measured. No abnormal sound was generated.

Moreover, with regard to forming material powder (2) (silicon nitride base), forming material powder (3) (alumina base), and forming material powder (4) (zirconia base), a plate-shaped test piece for resistance measurement having size of 4 mm×8 mm×20 mm was produced for each of different TiN contents; and electric specific resistance (corresponding to electric resistivity) of the test piece in the longitudinal direction was measured by a DC four probe method. Results of the measurement are shown in Table 1.

TABLE 1

| | TiN cont. (vol %) | | | | | | | |
|---|---|---|---|---|---|---|---|---|
| Matrix | 8 | 15 | 17 | 20 | 25 | 30 | 50 | 70 |
| Silicon nitride based | >10$^{12}$ | 7 × 10$^4$ | 1 × 10$^4$ | 2 × 10$^3$ | 80 | 20 | 10 | 3 |
| Alumina based | >10$^{12}$ | 1 × 10$^5$ | 5 × 10$^3$ | 7 × 10$^2$ | 1 × 10$^2$ | 50 | 7 | 5 |
| Zirconia based | 10$^7$ | 3 × 10$^4$ | 5 × 10$^2$ | 2 | 1 × 10$^{-2}$ | 7 × 10$^{-3}$ | 1 × 10$^{-4}$ | 1 × 10$^{-4}$ |

Electric specific resistance (unit: Ω · cm)

As seen from Table 1, when the content of titanium nitride is made 10% by volume or greater, electric specific resistance can be decreased to 10$^6$ Ω·cm or less.

Obviously, numerous modifications and variations of the present invention are possible in light of the above teachings. It is therefore to be understood that within the scope of the appended claims, the present invention may be practiced otherwise than as specifically described herein.

We claim:

1. A ceramic ball for a ball bearing assembly, characterized in that at least a portion of a constituent ceramic of said ball is formed of an electrically conductive inorganic compound containing as a cationic component at least one element selected from among Hf, Mo, Ti, Zr, Nb, W, and Si and wherein said constituent ceramic has an electrical resistivity of not greater than $10^6$ Ω·cm.

2. The ceramic ball for a ball bearing assembly as described in claim 1, wherein said electrically conductive inorganic compound consists of at least one member selected from among metal nitrides, metal carbides, metal borides, metal carbide nitrides, each containing as a metallic cationic component at least one element selected from among Hf, Mo, Ti, Zr, Nb, and Ta, tungsten carbide, and silicon carbide.

3. The ceramic ball for a bearing as described in claim 2, wherein said electrically conductive inorganic compound consists of one or more compounds selected from among titanium nitride, titanium carbide, titanium boride, tungsten carbide, zirconium nitride, titanium carbide nitride, silicon carbide, and niobium carbide.

4. The ceramic ball for a bearing as described in claim 1, wherein said electrically conductive inorganic compound is an electrically conductive oxide.

5. The ceramic ball for a bearing as described in claim 4, wherein said electrically conductive oxide is a titanium oxide.

6. The ceramic ball for a ball bearing assembly as described in claim 1, wherein said constituent ceramic is a composite ceramic which has a microstructure such that said electrically conductive inorganic compound is dispersed in a ceramic matrix formed of alumina ceramic, zirconia ceramic, or silicon nitride ceramic.

7. The ceramic ball for a ball bearing assembly as described in claim 6, wherein said the content of said electrically conductive inorganic compound in said constituent ceramic is 15 to 70% by volume.

8. A ball bearing assembly, characterized by including, as bearing rolling elements, a plurality of the ceramic balls described in claim 1.

* * * * *